United States Patent
Liu et al.

(10) Patent No.: US 9,160,433 B2
(45) Date of Patent: Oct. 13, 2015

(54) BEAM CODEBOOK GENERATION METHOD, BEAM SEARCH METHOD AND RELATED APPARATUSES

(71) Applicants: Huawei Technologies CO., LTD., Shenzhen, Guangdong (CN); Beijing University of Posts and Telecommunications, Beijing (CN)

(72) Inventors: Pei Liu, Beijing (CN); Guanglong Du, Beijing (CN); Weixia Zou, Beijing (CN)

(73) Assignees: Huawei Technologies Co., Ltd., Shenzhen (CN); Beijing University of Posts & Telecommunications, Beijing (CN)

( * ) Notice: Subject to any disclaimer, the term of this patent is extended or adjusted under 35 U.S.C. 154(b) by 0 days.

(21) Appl. No.: 14/610,583

(22) Filed: Jan. 30, 2015

(65) Prior Publication Data

US 2015/0171945 A1    Jun. 18, 2015

Related U.S. Application Data

(63) Continuation of application No. PCT/CN2013/075299, filed on May 8, 2013.

(30) Foreign Application Priority Data

Jul. 31, 2012  (CN) .......................... 2012 1 0268457

(51) Int. Cl.
*H04B 3/00* (2006.01)
*H04L 25/00* (2006.01)
(Continued)

(52) U.S. Cl.
CPC ............ *H04B 7/0465* (2013.01); *H04B 7/0456* (2013.01); *H04B 7/06* (2013.01); *H04B 7/0617* (2013.01); *H04L 25/03898* (2013.01)

(58) Field of Classification Search
CPC ...... H04B 7/0465; H04B 7/0617; H04B 7/06; H04B 25/03898; H04B 7/0456
See application file for complete search history.

(56) References Cited

U.S. PATENT DOCUMENTS

| 2006/0156282 A1* | 7/2006 | Mathew ........................ 717/108 |
| 2007/0037528 A1 | 2/2007 | Doan et al. |

(Continued)

FOREIGN PATENT DOCUMENTS

| CN | 1553725 A | 12/2004 |
| CN | 101527590 A | 9/2009 |

(Continued)

OTHER PUBLICATIONS

"IEEE Standard for Information technology; Telecommunications and information exchange between systems; Local and metropolitan area networks; Specific requirements; Part 15.3: Wireless Medium Access Control(MAC) and Physical Layer(PHY) Specification for High Rate Wireless Personal Area Network(WPANs); Amendment2: Millimeter-wave-based Alternative Physical Layer Extension," IEEE Std 802.15.3c, pp. i-203, Institute of Electrical and Electronics Engineers, New York, New York (Oct. 12, 2009).

(Continued)

*Primary Examiner* — Erin File
(74) *Attorney, Agent, or Firm* — Leydig, Voit & Mayer, Ltd.

(57) ABSTRACT

Embodiments of the present invention disclose a beam codebook generation method, includes: calculating a first array response factor of a reference beam according to the number of actually generated beam signal channels, and calculating a second array response factor of the reference beam according to the preset number of target beam signal channels; performing radiated power normalization processing on the first array response factor to obtain a first radiation factor of the reference beam, and performing radiated power normalization processing on the second array response factor to obtain a second radiation factor of the reference beam; performing normalization processing on the first radiation factor and second radiation factor to obtain a beam codebook of the reference beam; and performing rotation processing on the obtained beam codebook of the reference beam to obtain a beam codebook of one or more other beams except the reference beam in the target beams.

19 Claims, 6 Drawing Sheets

(51) Int. Cl.
*H04B 7/04* (2006.01)
*H04L 25/03* (2006.01)
*H04B 7/06* (2006.01)

(56) References Cited

U.S. PATENT DOCUMENTS

| | | | |
|---|---|---|---|
| 2009/0270051 A1 | 10/2009 | Choi et al. | |
| 2010/0054114 A1 | 3/2010 | Li et al. | |
| 2010/0290549 A1 | 11/2010 | Yang et al. | |
| 2011/0018767 A1 | 1/2011 | Maltsev et al. | |
| 2011/0122782 A1* | 5/2011 | Choi et al. | 370/252 |
| 2012/0189075 A1* | 7/2012 | Wang et al. | 375/267 |
| 2013/0017836 A1* | 1/2013 | Chang et al. | 455/452.1 |
| 2013/0040682 A1* | 2/2013 | Chang et al. | 455/517 |
| 2013/0064129 A1* | 3/2013 | Koivisto et al. | 370/252 |

FOREIGN PATENT DOCUMENTS

| | | |
|---|---|---|
| CN | 101677251 A | 3/2010 |
| CN | 102110883 A | 6/2011 |
| CN | 102394680 A | 3/2012 |

OTHER PUBLICATIONS

"Draft Standard for Information Technology; Telecommunications and Information Exchange Between Systems; Local and Metropolitan Area Networks; Specific Requirements; Part 11: Wireless LAN Medium Access Control(MAC) and Physical Layer(PHY)Specifications; Amendment 3: Enhancements for Very High Throughput in the 60 GHz Band," IEEE P802.11ad/D7.0, pp. 1-661, Institute of Electrical and Electronics Engineers, New York, New York (Apr. 2012).

Hur et al., "Multilevel millimeter wave beamforming for wireless backhaul," 2011 IEEE Globecom Workshops (GC Wkshps), pp. 253-257, Institute of Electrical and Electronics Engineers, New York, New York (Dec. 5-9, 2011).

Lee et al., "Low Complexity Codebook-Based Beamforming for MIMO-OFDM Systems in Millimeter-Wave WPAN," IEEE Transactions on Wireless Communications, vol. 10, No. 11, pp. 3607-3612, Institute of Electrical and Electronics Engineers, New York, New York (Nov. 2011).

\* cited by examiner

BEAM CODEBOOK GENERATION METHOD, BEAM SEARCH METHOD AND RELATED APPARATUSES

CROSS REFERENCE

This application is a continuation of International Patent Application No. PCT/CN2013/075299, filed on May 8, 2013, which claims priority to Chinese Patent Application No. 201210268457.1, filed on Jul. 31, 2012, both of which are hereby incorporated by reference in their entireties.

TECHNICAL FIELD

The present invention relates to the communications field, and in particular, to a beam codebook generation method, a beam search method, and related apparatuses.

BACKGROUND

In a beamforming system, at a transmit end, after being multiplied by a transmitting weight vector w, transmitted signals are transmitted to a radio channel by using different antenna array elements; and, at a receive end, received signals of the antenna array elements are transmitted to a signal processing module after weighted vector summation of a receiving weight c is performed. Forming of a target beam is categorized into an adaptive beamforming technology and a beam switching technology. The adaptive beamforming technology is to obtain an optimal beam mode after a series of operations, that is, an antenna weighted vector w, are performed on a signal received by an array antenna, and use the optimal beam mode for communication. Although the adaptive beamforming may be optimal in theory, its computing complexity is high and its convergence speed is slow. Therefore, a beam switching technology is introduced in order to reduce implementation difficulty. The beam switching technology refers to forming a beam codebook matrix $W=(w_0, w_1, \ldots, w_K)$ after the antenna weighted vector w required for beamforming is predefined and has a fixed value in a device, so that the device only needs to search for the weighted vector in beam codebook space during practical communication. Currently, the beam switching technology is widely applied in millimetric wave communications. All 60 GHz millimetric wave communications standards (IEEE802.15.3c, IEEE802.11ad, Chinese standards, and the like), which are currently released or under development, support the beam switching technology that is based on a fixed beam codebook.

The currently released standard IEEE802.15.3c stipulates the beam codebook matrix W. Formula (1) is a formula for generating an element in a $p^{th}$ row and a $q^{th}$ column in the IEEE802.15.3c codebook matrix W, that is, a $p^{th}$-dimension element in a codebook vector wq of a $q^{th}$ beam, where M is the number of the antenna array elements, K is the number of beams ($K \geq M$, generally $K=2M$). Formula (1) denotes an N-phase codebook, where the codebook may use more fine-grained phases to generate a beam that has a higher main lobe gain and a lower side lobe level. In the formula, N is the number of phases.

$$W(p, q) = e^{j\frac{2\pi}{N} fix\left(\frac{p \times mod(q+K/2),K}{K/N}\right)}, \quad (1)$$
$$p = 0, 1, \ldots, M-1; q = 0, 1, \ldots, K-1$$

In a case in which the beam codebook is known (in a case in which formula (1) is known), the device can, during practical communication, obtain a sufficient antenna gain simply by searching for an optimal beam pair in a specific manner.

To improve beam search efficiency and reduce time consumption and energy consumption in a beam search process, a fast beam search algorithm is submitted to related Chinese 60 GHz millimetric wave communications standards. The algorithm first creates a model of a beam search issue by treating it as an optimization issue, and then uses sequence numbers of beams of both the transmit and receive ends as independent variables and uses strength or a signal-to-noise ratio of a received signal as a target function to obtain optimized search space. The fast beam search algorithm takes advantage of beam width difference generated by different numbers of the antenna array elements, and accelerates the beam search process based on a dichotomic search idea and a dichotomy policy. A currently used basic process of the fast beam search algorithm is as follows:

(a) Set the number of activated antenna array elements to m=2 and deactivate the remaining M−2 antenna array elements, perform beam search (in this case, the beams are relatively wide, the search space is relatively small, and a traverse method may be used) to obtain a current optimal beam pair, record a main lobe direction (f, φ) of an optimal beam, and record a search counter as i=1.

(b) Set i=i+1, set the number of activated antenna array elements to m=2i and set the number of deactivated antenna array elements to M−2i, use beams close to the currently recorded optimal main lobe direction (f, φ) as an initial beam pair to continue the beam search and obtain an optimal beam pair, and update the record of the main lobe direction (f, φ) of the optimal beam.

(c) If all antenna array elements are put into use (m=M), end the search and use the currently recorded optimal beam pair as a final search result; otherwise, return to step (b).

It can be learnt from the foregoing description that, when the beam codebook is calculated by using formula (1) currently, in order to implement beam search, activation and deactivation control needs to be performed separately on each antenna array element of a phased array antenna until all antenna array elements are in an activated state, which undoubtedly increases hardware implementation difficulty and is adverse to algorithm implementation.

SUMMARY

Embodiments of the present invention provide a beam codebook generation method, a beam codebook generation apparatus, and a beam search method and apparatus, so that when beam search is performed by using a generated beam codebook, all beam signal channels may be used and hardware implementation difficulty is reduced.

A first aspect of the present invention provides a beam codebook generation method, which may include:

calculating a first array response factor of a reference beam with a specified sequence number in target beams according to the number of actually generated beam signal channels, and calculating a second array response factor of the reference beam in the target beams according to the preset number of target beam signal channels;

performing radiated power normalization processing on the first array response factor to obtain a first radiation factor of the reference beam, and performing radiated power normalization processing on the second array response factor to obtain a second radiation factor of the reference beam;

performing normalization processing on the obtained first radiation factor and second radiation factor of the reference beam to obtain a beam codebook of the reference beam; and performing rotation processing on the obtained beam codebook of the reference beam to obtain a beam codebook of one or more other beams except the reference beam in the target beams.

In a first possible implementation manner, a value of the number of the target beam signal channels is less than or equal to the number of the actually generated beam signal channels.

With reference to the first aspect or the first possible implementation manner of the first aspect, in a second possible implementation manner, the number of the target beams is less than or equal to twice of the number of the target beam signal channels, and the sequence number of the reference beam in the target beams is less than or equal to the number of the target beam signal channels.

With reference to the first aspect or the first possible implementation manner of the first aspect or the second possible implementation manner of the first aspect, in a third possible implementation manner, the calculating a first array response factor of a reference beam with a specified sequence number in target beams according to the number of actually generated beam signal channels includes:

calculating the first array response factor of the reference beam in the target beams according to a formula $$AF_i^{(M,m)} = w_i^H a(\theta) = \sum_{p=0}^{M-1} w_{p,i}^* e^{j\frac{d}{\lambda}2\pi p\sin\theta},$$

where i is the sequence number of the reference beam, $AF_i^{(M,m)}$ is a first array response factor of a reference beam with a sequence number i, $W_i$ is an array weighted vector of the reference beam in a beam codebook matrix, p is a sequence number of an actually generated beam signal channel, M is the number of the actually generated beam signal channels, m is the set number of target beam signal channels, θ is an angle of direction of arrival, a(θ) is a steering vector of a received signal, and d and λ are array element spacing and a carrier wavelength respectively; and the calculating a second array response factor of the reference beam in the target beams according to the preset number of target beam signal channels includes:

calculating the second array response factor of the reference beam in the target beams according to a formula $$AF_i^{(m)} = w_i^H a(\theta) = \sum_{q=0}^{m-1} w_{q,i}^* e^{j\frac{d}{\lambda}2\pi p\sin\theta},$$

where i is the sequence number of the reference beam, $AF_i^{(m)}$ is a second array response factor of the reference beam with the sequence number i, $W_i$ is the array weighted vector of the reference beam in the beam codebook matrix, H and * indicate conjugate transpose and conjugate respectively, q is a sequence number of a target beam signal channel, where values of q are 0, 1, . . . , m−1 successively, m is the set number of the target beam signal channels, θ is the angle of direction of arrival, a(θ) is the steering vector of the received signal, and d and λ are the array element spacing and the carrier wavelength respectively.

With reference to the third possible implementation manner of the first aspect, in a fourth possible implementation manner, the performing radiated power normalization processing on the first array response factor to obtain a first radiation factor of the reference beam includes:

calculating the first radiation factor of the reference beam according to a formula $$G_i^{(M,m)} = \frac{\|AF_i^{(M,m)}\|^2}{m \times \int \|AF_i^{(M,m)}\|^2 d\theta},$$

where i is the sequence number of the reference beam, $G_i^{(M,m)}$ is a first radiation factor of the reference beam with the sequence number i, $AF_i^{(M,m)}$ is the first array response factor of the reference beam, m is the set number of the target beam signal channels, θ is the angle of direction of arrival, and d is the array element spacing expressed by the carrier wavelength; and the performing radiated power normalization processing on the second array response factor to obtain a second radiation factor of the reference beam includes:

calculating the second radiation factor of the reference beam according to a formula $$\mathcal{G}_i^{(m)} = \frac{\|AF_i^{(m)}\|^2}{m \times \int \|AF_i^{(m)}\|^2 d\theta},$$

where i is the sequence number of the reference beam, $\mathcal{G}_i^{(m)}$ is a second radiation factor of the reference beam with the sequence number i, $AF_i^{(m)}$ is the second array response factor of the reference beam, m is the set number of the target beam signal channels, θ is the angle of direction of arrival, and d is the array element spacing expressed by the carrier wavelength.

With reference to the fourth possible implementation manner of the first aspect, in a fifth possible implementation manner, the performing normalization processing on the obtained first radiation factor and second radiation factor of the reference beam to obtain a beam codebook of the reference beam includes:

calculating the beam codebook of the reference beam according to a formula $$w_i^{(M,m)} = \operatorname*{argmin}_{|w_{p,i}|=1} \left\{ \int_0^{2\pi} |\mathcal{G}_i^{(m)} - G_i^{(M,m)}|^2 d\theta \right\},$$

where i is the sequence number of the reference beam, $w_i^{(M,m)}$ is a beam codebook of the reference beam with the sequence number i, M is the number of the actually generated beam signal channels, m is the set number of the target beam signal channels, p is a sequence number of an actually generated beam signal channel, where values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition.

With reference to the fourth possible implementation manner of the first aspect, in a sixth possible implementation manner, the performing normalization processing on the obtained first radiation factor and second radiation factor of the reference beam to obtain a beam codebook of the reference beam includes:

calculating the beam codebook of the reference beam according to a formula $$w_i^{(M,m)} = \underset{|w_{p,i}|=1}{\operatorname{argmin}}\left\{ \int_0^{2\pi} |\mathcal{G}_i^{(m)} - G_i^{(M,m)}| d\theta \right\},$$

where i is the sequence number of the reference beam, $w_i^{(M,m)}$ is a beam codebook of the reference beam with the sequence number i, M is the number of the actually generated beam signal channels, m is the set number of the target beam signal channels, p is a sequence number of an actually generated beam signal channel, where values of p are 0, 1, ..., M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition.

With reference to the fourth possible implementation manner of the first aspect, in a seventh possible implementation manner, the performing normalization processing on the obtained first radiation factor and second radiation factor of the reference beam to obtain a beam codebook of the reference beam includes:

calculating the beam codebook of the reference beam according to a formula $$w_i^{(M,m)} = \operatorname{argmin}\left\{ \int_0^{2\pi} |\mathcal{G}_i^{(m)} - G_i^{(M,m)}|^2 d\theta \right\},$$

where i is the sequence number of the reference beam, $w_i^{(M,m)}$ is the beam codebook of the reference beam with the sequence number i, M is the number of the actually generated beam signal channels, m is the set number of the target beam signal channels, p is a sequence number of an actually generated beam signal channel, where values of p are 0, 1, ..., M−1 successively, $\mathcal{G}_i^{(m)}$ is the second radiation factor of the reference beam, $G_i^{(M,m)}$ is the first radiation factor of the reference beam, θ is the angle of direction of arrival, and d is the array element spacing expressed by the carrier wavelength.

With reference to the fifth possible implementation manner of the first aspect or with reference to the sixth possible implementation manner of the first aspect or with reference to the seventh possible implementation manner of the first aspect, in an eighth possible implementation manner, the performing rotation processing on the obtained beam codebook of the reference beam to obtain a beam codebook of one or more other beams except the reference beam in the target beams includes:

calculating the beam codebook of one or more other beams except the reference beam in the target beams according to a formula $$\operatorname{angle}(w_{p,r}) = \operatorname{angle}(w_{p,i}) + p\frac{q-m}{2m}\pi,$$

where p is the sequence number of the actually generated beam signal channel, i is the sequence number of the reference beam, $\operatorname{angle}(w_{p,r})$ is a phase value of a beam codebook of a beam with a sequence number r, M is the number of the actually generated beam signal channels, m is the set number of the target beam signal channels, K is the number of target beams, r is a sequence number of a target beam, values of p are 0, 1, ..., M−1 successively, values of r are 0, 1, ..., i−1, i+1, ..., K−1 successively, and $\operatorname{angle}(w_{p,i})$ is a phase value of the beam codebook of the reference beam.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, in a ninth possible implementation manner, the beam signal channel is an antenna array element channel or a filter channel.

A second aspect of the present invention provides a beam search method, which may use a beam codebook to perform beam search, where the beam codebook is generated by using a beam codebook generation method provided in the present invention, and the beam search method may specifically include:

performing beam search by using a beam codebook as a beam search condition to obtain a current optimal beam pair, where the beam codebook is calculated when the number of target beam signal channels is 2, recording a main lobe direction of an optimal beam, and initializing a search counter to a=1;

increasing the search counter a with an increment of 1, continuing to perform the beam search by using a beam codebook as a beam search condition to obtain a current optimal beam pair, where the beam codebook is calculated when the number of the target beam signal channels is $2^a$, and recording the main lobe direction of the optimal beam; and performing the foregoing step repeatedly until the number of the target beam signal channels is equal to the number of actually generated beam signal channels and then ending the search, and using a current optimal beam pair, which is recorded when the search is ended, as an optimal beam pair, where the foregoing step is: increasing the search counter a with an increment of 1, continuing to perform the beam search by using a beam codebook as a beam search condition to obtain a current optimal beam pair, where the beam codebook is calculated when the number of the target beam signal channels is $2^a$, and recording the main lobe direction of the optimal beam.

A third aspect of the present invention provides a beam codebook generation apparatus, which may include:

an array response factor obtaining unit, configured to calculate a first array response factor of a reference beam with a specified sequence number in target beams according to the number of actually generated beam signal channels, and calculate a second array response factor of the reference beam in the target beams according to the preset number of target beam signal channels;

a radiation factor obtaining unit, configured to perform radiated power normalization processing on the first array response factor, which is obtained by the array response factor obtaining unit, to obtain a first radiation factor of the reference beam, and perform radiated power normalization processing on the second array response factor, which is obtained by the array response factor obtaining unit, to obtain a second radiation factor of the reference beam;

a first beam codebook obtaining unit, configured to perform normalization processing on the first radiation factor and the second radiation factor of the reference beam, which are obtained by the radiation factor obtaining unit, to obtain a beam codebook of the reference beam; and a second beam codebook obtaining unit, configured to perform rotation processing on the beam codebook of the reference beam to obtain a beam codebook of one or more other beams except the reference beam in the target beams, where the beam codebook of the reference beam is obtained by the first beam codebook obtaining unit.

In a first possible implementation manner, the beam search apparatus of the present invention further includes:

a setting unit, configured to set the number of the target beam signal channels and the sequence number of the reference beam, where a value of the set number of the target beam signal channels is less than or equal to the number of the beam signal channels.

With reference to the third aspect or the first possible implementation manner of the third aspect, in a second possible implementation manner, the setting unit sets the sequence number of the reference beam to be less than or equal to the number of the target beam signal channels.

With reference to the third aspect or the first possible implementation manner of the third aspect or the second possible implementation manner of the third aspect, in a third possible implementation manner, the array response factor obtaining unit is specifically configured to: according to a formula $$AF_i^{(M,m)} = w_i^H a(\theta) = \sum_{p=0}^{M-1} w_{p,i}^* e^{j\frac{d}{\lambda}2\pi p \sin\theta},$$

calculate the first array response factor of the reference beam in the target beams, where i is the sequence number of the reference beam, $AF_i^{(M,m)}$ is a first array response factor of a reference beam with a sequence number i, $W_i$ is an array weighted vector of the reference beam in a beam codebook matrix, H and * indicate conjugate transpose and conjugate respectively, p is a sequence number of an actually generated beam signal channel, where values of p are 0, 1, ..., M−1 successively, M is the number of the actually generated beam signal channels, m is the set number of target beam signal channels, θ is an angle of direction of arrival, a(θ) is a steering vector of a received signal, and d and λ are array element spacing and a carrier wavelength respectively; and the array response factor obtaining unit is specifically configured to: according to a formula $$AF_i^{(m)} = w_i^H a(\theta) = \sum_{q=0}^{m-1} w_{q,i}^* e^{j\frac{d}{\lambda}2\pi p \sin\theta},$$

calculate the second array response factor of the reference beam in the target beams, where i is the sequence number of the reference beam, $AF_i^{(m)}$ is the second array response factor of the reference beam with the sequence number i, $W_i$ is the array weighted vector of the reference beam in the beam codebook matrix, H and * indicate conjugate transpose and conjugate respectively, q is a sequence number of a target beam signal channel, where values of q are 0, 1, ..., m−1 successively, m is the set number of the target beam signal channels, θ is the angle of direction of arrival, a(θ) is the steering vector of the received signal, and d and λ are the array element spacing and the carrier wavelength respectively.

With reference to the third possible implementation manner of the third aspect, in a fourth possible implementation manner, the radiation factor obtaining unit is specifically configured to: according to a formula $$G_i^{(M,m)} = \frac{\|AF_i^{(M,m)}\|^2}{m \times \int \|AF_i^{(M,m)}\|^2 d\theta},$$

calculate the first radiation factor of the reference beam in the target beams, where i is the sequence number of the reference beam, $G_i^{(M,m)}$ is a first radiation factor of the reference beam with the sequence number i, $AF_i^{(M,m)}$ is the first array response factor of the reference beam, m is the set number of the target beam signal channels, θ is the angle of direction of arrival, and d is the array element spacing expressed by the carrier wavelength; and the radiation factor obtaining unit is specifically configured to: according to a formula $$\mathcal{G}_i^{(m)} = \frac{\|AF_i^{(m)}\|^2}{m \times \int \|AF_i^{(m)}\|^2 d\theta},$$

calculate the second radiation factor of the reference beam in the target beams, where i is the sequence number of the reference beam, $\mathcal{G}_i^{(m)}$ is a second radiation factor of the reference beam with the sequence number i, $AF_i^{(m)}$ the second array response factor of the reference beam, m is the set number of the target beam signal channels, θ is the angle of direction of arrival, and d is the array element spacing expressed by the carrier wavelength.

With reference to the fourth possible implementation manner of the third aspect, in a fifth possible implementation manner, the first beam codebook obtaining unit is specifically configured to: according to a formula $$w_i^{(M,m)} = \underset{|w_{p,i}|=1}{\operatorname{argmin}} \left\{ \int_0^{2\pi} |\mathcal{G}_i^{(m)} - G_i^{(M,m)}|^2 d\theta \right\},$$

calculate the beam codebook of the reference beam, where i is the sequence number of the reference beam, $w_i^{(M,m)}$ is a beam codebook of the reference beam with the sequence number i, M is the number of the actually generated beam signal channels, m is the set number of the target beam signal channels, p is a sequence number of an actually generated beam signal channel, where values of p are 0, 1, ..., M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition.

With reference to the fourth possible implementation manner of the third aspect, in a sixth possible implementation manner, the first beam codebook obtaining unit is specifically configured to: according to a formula $$w_i^{(M,m)} = \underset{|w_{p,i}|=1}{\operatorname{argmin}} \left\{ \int_0^{2\pi} |\mathcal{G}_i^{(m)} - G_i^{(M,m)}| \, d\theta \right\},$$

calculate the beam codebook of the reference beam, where
i is the sequence number of the reference beam, $w_i^{(M,m)}$ is a beam codebook of the reference beam with the sequence number i, M is the number of the actually generated beam signal channels, m is the set number of the target beam signal channels, p is a sequence number of an actually generated beam signal channel, where values of p are 0, 1, ..., M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, $|w_{p,i}|=1$ and indicates a phase control condition.

With reference to the fourth possible implementation manner of the third aspect, in a seventh possible implementation manner, the first beam codebook obtaining unit is specifically configured to: according to a formula $$w_i^{(M,m)} = \operatorname{argmin}\left\{ \int_0^{2\pi} |\mathcal{G}_i^{(m)} - G_i^{(M,m)}|^2 \, d\theta \right\},$$

calculate the beam codebook of the reference beam, where
i is the sequence number of the reference beam, $w_i^{(M,m)}$ is the beam codebook of the reference beam with the sequence number i, M is the number of the actually generated beam signal channels, m is the set number of the target beam signal channels, p is a sequence number of an actually generated beam signal channel, where values of p are 0, 1, ..., M−1 successively, $\mathcal{G}_i^{(m)}$ is the second radiation factor of the reference beam, $G_i^{(M,m)}$ is the first radiation factor of the reference beam, θ is the angle of direction of arrival, and d is the array element spacing expressed by the carrier wavelength.

With reference to the fifth possible implementation manner of the third aspect or with reference to the sixth possible implementation manner of the third aspect or with reference to the seventh possible implementation manner of the third aspect, in an eighth possible implementation manner, the second beam codebook obtaining unit is specifically configured to: according to a formula $$\operatorname{angle}(w_{p,r}) = \operatorname{angle}(w_{p,i}) + p\frac{q-m}{2m}\pi,$$

calculate the beam codebook of one or more other beams except the reference beam in the target beams, where
p is the sequence number of the actually generated beam signal channel, i is the sequence number of the reference beam, $\operatorname{angle}(w_{p,r})$ is a phase value of a beam codebook of a beam with a sequence number r, M is the number of the actually generated beam signal channels, m is the set number of the target beam signal channels, K is the number of target beams, r is a sequence number of a target beam, values of p are 0, 1, ..., M−1 successively, values of r are 0, 1, ..., i−1, i+1, ..., K−1 successively, and $\operatorname{angle}(w_{p,i})$ is a phase value of the beam codebook of the reference beam.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, in a ninth possible implementation manner, the beam signal channel is an antenna array element channel or a filter channel.

A fourth aspect of the present invention provides a beam search apparatus, which may include:
a setting unit, configured to set a search counter and initialize the search counter to a=1;
a searching unit, configured to: perform beam search by using a beam codebook as a beam search condition to obtain a current optimal beam pair, where the beam codebook is generated by the beam codebook generation apparatus according to the present invention when the number of target beam signal channels are $2^a$; and record a main lobe direction of an optimal beam; and
a controlling unit, configured to: after each time the searching unit performs the beam search by using the beam codebook as the beam search condition, where the beam codebook is generated when the number of target beam signal channels are 2a, control the setting unit to increase the search counter with an increment of 1, and determine whether the number of the target beam signal channels obtained after the increase of the search counter is equal to the number of actually generated beam signal channels, and, if a result of the determining is yes, instruct the searching unit to continue to perform the beam search by using the beam codebook as the beam search condition, where the beam codebook is generated when the number of target beam signal channels are 2a, and, if the result of the determining is no, instruct the searching unit to end the search, and use a current optimal beam pair, which is recorded when the search is ended, as an optimal beam pair.

A fifth aspect of the present invention provides a beam search system, which may include any beam codebook generation apparatus mentioned in the present invention and any beam search apparatus mentioned in the present invention.

It can be learned from the foregoing description that, in feasible implementation manners of the present invention, the number of target beam signal channels is set, and a beam codebook is calculated based on the number of actually generated beam signal channels and the set number of the target beam signal channels, where the beam codebook is generated under a circumstance of the number of the actually generated beam signal channels, where the circumstance is equivalent to a circumstance of the number of the target beam signal channels, so that when beam search is performed by using the generated beam codebook, all actual beam signal channels may be used, and it is unnecessary to perform activation and deactivation control on a single beam signal channel, which reduces hardware implementation difficulty.

DESCRIPTION OF EMBODIMENTS

To make objectives, technical solutions and advantages of the present invention clearer, the following describes the present invention in more detail with reference to accompanying drawings.

In some feasible implementation manners of the present invention, the number of target beam signal channels is set, and a beam codebook is calculated based on the number of actually generated beam signal channels and the set number of the target beam signal channels, where the beam codebook is generated under a circumstance of the number of the actually generated beam signal channels, where the circumstance is equivalent to a circumstance of the number of the target beam signal channels, so that when beam search is performed by using the generated beam codebook, all actual beam signal channels may be used, and it is unnecessary to perform activation and deactivation control on a single beam signal channel, which reduces hardware implementation difficulty.

Figure 1:
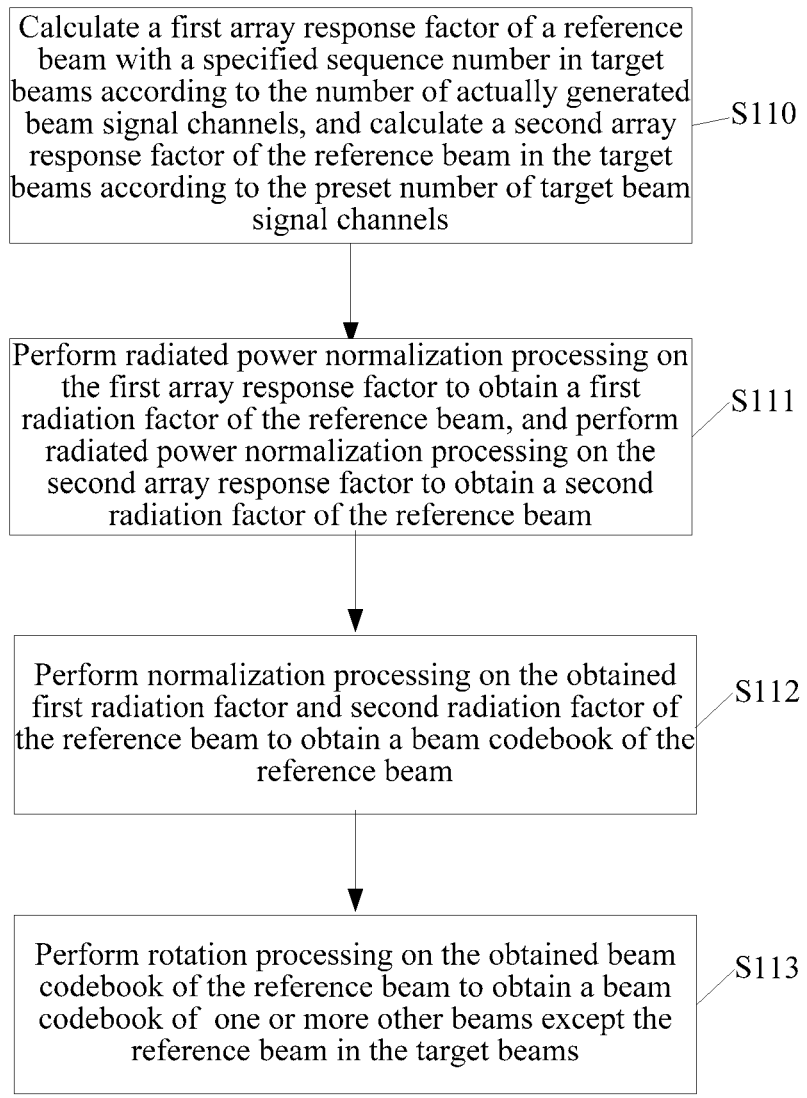
FIG. 1 is a schematic flowchart of a first embodiment of a beam codebook generation method according to the present invention.

FIG. 1 is a schematic flowchart of a first embodiment of a beam codebook generation method according to the present invention. As shown in FIG. 1, the beam codebook generation method of the present invention may include the following steps:

Step S110: Calculate a first array response factor of a reference beam with a specified sequence number in target beams according to the number of actually generated beam signal channels, and calculate a second array response factor of the reference beam in the target beams according to the preset number of target beam signal channels, where the array response factor is a weighted value assigned by a system to each beam signal channel.

In some feasible embodiments, actual beam signal channels in the present invention may be antenna array element channels or filter channels or other beam signal channels that are formed by other devices capable of generating beam channels, and an antenna array element may be an antenna array element formed of phased array antennas. When beam signal channels are antenna array element channels, the number of the beam signal channels may be the number of antenna array elements. In this case, the array response factor is a weighted value assigned by the system to each antenna array element. The number of the actually generated beam signal channels is the number of beam signal channels that can be actually generated by the foregoing devices capable of generating beam channels, and the number of the target beam signal channels is the number of beam signal channels expected to be generated by the devices capable of generating beam channels.

In some feasible embodiments, the value of the number of the target beam signal channels, which is set in the present invention, may be less than or equal to the number of the actually generated beam signal channels. For example, using the number of antenna array elements as an example for description, and assuming that the number of actual antenna array elements is M (M is a positive integer) and the set number of the target antenna array elements is m (m is a positive integer), in some feasible embodiments, m and M may satisfy a condition: m<M.

In some feasible embodiments, the number of the target beams corresponds to the set number of the target beam signal channels. Generally, the number of the target beams may be less than or equal to twice of the number of the target beam signal channels, and the sequence number of the reference beam in the target beams may be less than or equal to the number of the target beam signal channels. For example, description is given by using an example in which the number of the actual antenna array elements is M (M is a positive integer), the number of the target antenna array elements is m (m is a positive integer), the number of the target beams are K (K is a positive integer), and the sequence number of the reference beam is i, in some feasible embodiments, K≤2m and i≤m.

In some feasible embodiments, a method for calculating the first array response factor of the reference beam in the target beams according to the number of the actually generated beam signal channels may be expressed by formula (2):

$$AF_i^{(M,m)} = w_i^H a(\theta) = \sum_{p=0}^{M-1} w_{p,i}^* e^{j\frac{d}{\lambda} 2\pi p \sin\theta}. \quad (2)$$

In formula (2), i is the sequence number of the reference beam (as described above, in some feasible embodiments, i may satisfy: i≤m), $W_i$ is an array weighted vector of the reference beam in a beam codebook matrix, H and * indicate conjugate transpose and conjugate respectively, p is a sequence number of an actually generated beam signal channel, where values of p are 0, 1, ..., M−1 successively, M is the number of the actually generated beam signal channels, m is the set number of the target beam signal channels (as described above, in some feasible embodiments, m may satisfy: m<M), θ is an angle of direction of arrival, a(θ) is a steering vector of a received signal, and d and λ are array element spacing and a carrier wavelength respectively.

In some feasible embodiments, $w_{p,i}$ may be obtained according to formula (1) or another known array weighted vector calculation method, which is not detailed here.

In some feasible embodiments, a method for calculating the second array response factor of the reference beam in the target beams according to the number of the actually generated beam signal channels may be expressed by formula (3):

$$AF_i^{(m)} = w_i^H a(\theta) = \sum_{q=0}^{m-1} w_{q,i}^* e^{j\frac{d}{\lambda} 2\pi p \sin\theta}. \quad (3)$$

In formula (3), i is the sequence number of the reference beam (as described above, in some feasible embodiments, i may satisfy: i≤m), $W_i$ is the array weighted vector of the reference beam in the beam codebook matrix, H and * indicate conjugate transpose and conjugate respectively, q is a sequence number of a target beam signal channel, where values of q are 0, 1, ..., m−1 successively, m is the set number of the target beam signal channels (as described above, in some feasible embodiments, m may satisfy: m<M), θ is the angle of direction of arrival, a(θ) is the steering vector of the received signal, and d and λ are the array element spacing and the carrier wavelength respectively.

In some feasible embodiments, $w_{q,i}$ may be obtained according to formula (1) or another known array weighted vector calculation method, which is not detailed here.

Step S111: Perform radiated power normalization processing on the first array response factor to obtain a first radiation factor of the reference beam, and perform radiated power normalization processing on the second array response factor to obtain a second radiation factor of the reference beam, where the radiation factor is a weighted value assigned to the beam signal when the beam signal channel transmits a signal.

In some feasible embodiments, a method for performing radiated power normalization processing on the first array response factor to obtain a first radiation factor of the reference beam may be expressed by formula (4):

$$G_i^{(M,m)} = \frac{\|AF_i^{(M,m)}\|^2}{m \times \int \|AF_i^{(M,m)}\|^2 d\theta}. \quad (4)$$

In formula (4), i is the sequence number of the reference beam (as described above, in some feasible embodiments, i may satisfy: i≤m), $AF_i^{(M,m)}$ is the first array response factor of the reference beam, m is the set number of the target beam signal channels (as described above, in some feasible embodiments, m may satisfy: m<M), θ is the angle of direction of arrival, and d is the array element spacing expressed by the carrier wavelength.

In some feasible embodiments, a method for performing radiated power normalization processing on the second array response factor to obtain a second radiation factor of the reference beam may be expressed by formula (5):

$$\mathcal{G}_i^{(m)} = \frac{\|AF_i^{(m)}\|^2}{m \times \int \|AF_i^{(m)}\|^2 d\theta}. \quad (5)$$

In formula (5), i is the sequence number of the reference beam (as described above, in some feasible embodiments, i may satisfy: i≤m), $AF_i^{(m)}$ is the second array response factor of the reference beam, m is the set number of the target beam signal channels (as described above, in some feasible embodiments, m may satisfy: m<M), θ is the angle of direction of arrival, and d is the array element spacing expressed by the carrier wavelength.

Step S112: Perform normalization processing on the obtained first radiation factor and second radiation factor of the reference beam to obtain a beam codebook of the reference beam.

In some feasible embodiments, a method for performing normalization processing on the obtained first radiation factor and second radiation factor of the reference beam to obtain a beam codebook of the reference beam may be expressed by formula (6):

$$w_i^{(M,m)} = \underset{|w_{p,m}|=1}{\arg\min}\left\{\int_0^{2\pi} |\mathcal{G}_i^{(m)} - G_i^{(M,m)}|^2 d\theta\right\}. \quad (6)$$

In formula (6), i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), p is the sequence number of the actually generated beam signal channel, where values of p are 0, 1, ..., M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition, that is, the beam codebook performs only phase rotation for a signal without performing amplitude adjustment.

In some feasible embodiments, a method for performing normalization processing on the obtained first radiation factor and second radiation factor of the reference beam to obtain a beam codebook of the reference beam may be expressed by formula (7):

$$w_i^{(M,m)} = \underset{|w_{p,i}|=1}{\arg\min}\left\{\int_0^{2\pi} |\mathcal{G}_i^{(m)} - G_i^{(M,m)}|^2 d\theta\right\}. \quad (7)$$

In formula (7), i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), p is the sequence number of the actually generated beam signal channel, where values of p are 0, 1, ..., M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition, that is, the beam codebook performs only phase rotation for a signal without performing amplitude adjustment.

In some feasible embodiments, a method for performing normalization processing on the obtained first radiation factor and second radiation factor of the reference beam to obtain a beam codebook of the reference beam may be expressed by formula (8):

$$w_i^{(M,m)} = \arg\min\left\{\int_0^{2\pi} |\mathcal{G}_i^{(m)} - G_i^{(M,m)}|^2 d\theta\right\}. \quad (8)$$

In formula (8), i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), p is the sequence number of the actually generated beam signal channel, where values of p are 0, 1, ..., M−1 successively, $\mathcal{G}_i^{(m)}$ is the second radiation factor of the reference beam, $G_i^{(M,m)}$ the first radiation factor of the reference beam, θ is the angle of direction of arrival, and d is the array element spacing expressed by the carrier wavelength.

Step S113: Perform rotation processing on the obtained beam codebook of the reference beam to obtain a beam codebook of one or more other beams except the reference beam in the target beams.

In some feasible embodiments, a method for performing rotation processing on the obtained beam codebook of the reference beam to obtain a beam codebook of one or more other beams except the reference beam in the target beams may be expressed by formula (9):

$$\text{angle}(w_{p,r}) = \text{angle}(w_{p,i}) + p\frac{q-m}{2m}\pi. \quad (9)$$

In formula (9), p is the sequence number of the actually generated beam signal channel, i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), K is the number of the target beams (as described above, in some feasible embodiments, K may satisfy: K≤2m), r is the sequence number of the target beam, values of p are 0, 1, ..., M−1 successively, values of r are 0, 1, ..., i−1, i+1, ..., K−1 successively, and angle($w_{p,i}$) is a phase value of the beam codebook of the reference beam.

In specific implementation, after the processing in step S113 is performed, calculated beam codebooks of all the K target beams may form a codebook matrix $W^{(M,m)}$.

Table 1 describes a beam codebook $W^{(4,2)}$ when M=4 and m=2, and Table 2 and Table 3 describe beam codebooks when M=8 and m=2 and m=4. Table 4 and Table 5 describe codebooks $W^{(16,2)}$ and $W^{(16,4)}$ respectively, and Table 6 describes a phase of a reference beam $w_8^{(16,8)}$ in a codebook $W^{(16,8)}$. Remaining 15 beams in $W^{(16,8)}$ may be obtained by using a rotation formula (9). Table 7 is a phase table of reference beams $w_{32}^{(32,2)}$, $w_{32}^{(32,4)}$, $w_{32}^{(32,8)}$, and $w_{32}^{(32,16)}$ in codebooks $W^{(32,2)}$, $W^{(32,4)}$, $W^{(32,8)}$, and $W^{(32,16)}$, and remaining beams may also be obtained by using a rotation formula (9). Data in the following tables is phase values of components in a weighted vector.

TABLE 1

Beam codebook phase table $W^{(4,2)}$ when M = 4 and m = 2

| angle($w_{i,m}$) | $w_0^{(4,2)}$ | $w_1^{(4,2)}$ | $w_2^{(4,2)}$ | $w_3^{(4,2)}$ |
|---|---|---|---|---|
| $w_{0,m}$ | 2.543478 | 2.543478 | 2.543478 | 2.543478 |
| $w_{1,m}$ | 0.666591 | 2.237387 | −2.475 | −0.90421 |
| $w_{2,m}$ | −2.47501 | 0.666584 | −2.47501 | 0.666584 |
| $w_{3,m}$ | −0.59814 | −2.16893 | 2.543457 | 0.972661 |

TABLE 2

Beam codebook phase table $W^{(8,2)}$ when M = 8 and m = 2

| angle($w_{i,m}$) | $w_0^{(8,2)}$ | $w_1^{(8,2)}$ | $w_2^{(8,2)}$ | $w_3^{(8,2)}$ |
|---|---|---|---|---|
| $w_{0,m}$ | −1.71397 | −1.71397 | −1.71397 | −1.71397 |
| $w_{1,m}$ | −0.12566 | 1.445133 | 3.01593 | −1.69646 |
| $w_{2,m}$ | 2.432319 | −0.70927 | 2.432319 | −0.70927 |
| $w_{3,m}$ | −1.57041 | −3.1412 | 1.571186 | 0.000389 |
| $w_{4,m}$ | 1.571126 | 1.571126 | 1.571126 | 1.571126 |
| $w_{5,m}$ | −0.70925 | 0.861542 | 2.432338 | −2.28005 |
| $w_{6,m}$ | 3.015939 | −0.12565 | 3.015939 | −0.12565 |
| $w_{7,m}$ | 1.427697 | −0.1431 | −1.7139 | 2.998494 |

TABLE 3

Beam codebook phase table $W^{(8,4)}$ when M = 8 and m = 4

| angle ($w_{i,m}$) | $w_0^{(8,4)}$ | $w_1^{(8,4)}$ | $w_2^{(8,4)}$ | $w_3^{(8,4)}$ | $w_4^{(8,4)}$ | $w_5^{(8,4)}$ | $w_6^{(8,4)}$ | $w_7^{(8,4)}$ |
|---|---|---|---|---|---|---|---|---|
| $w_{0,m}$ | 1.097999 | 1.097999 | 1.097999 | 1.097999 | 1.097999 | 1.097999 | 1.097999 | 1.097999 |
| $w_{1,m}$ | −0.80326 | −0.01786 | 0.767534 | 1.552932 | 2.33833 | 3.123728 | −2.37406 | −1.58866 |
| $w_{2,m}$ | 2.876721 | −1.83567 | −0.26487 | 1.305924 | 2.876721 | −1.83567 | −0.26487 | 1.305924 |
| $w_{3,m}$ | −0.14156 | 2.214634 | −1.71236 | 0.643838 | 3.000033 | −0.92696 | 1.429236 | −2.49775 |
| $w_{4,m}$ | 3.000031 | −0.14156 | 3.000031 | −0.14156 | 3.000031 | −0.14156 | 3.000031 | −0.14156 |
| $w_{5,m}$ | −0.26486 | −2.62106 | 1.305935 | −1.05026 | 2.876731 | 0.520537 | −1.83566 | 2.091333 |
| $w_{6,m}$ | 2.338348 | 0.767551 | −0.80325 | −2.37404 | 2.338348 | 0.767551 | −0.80325 | −2.37404 |
| $w_{7,m}$ | −2.04349 | −2.82889 | 2.668898 | 1.8835 | 1.098102 | 0.312704 | −0.47269 | −1.25809 |

TABLE 4

Beam codebook phase table $W^{(16,2)}$ when M = 16 and m = 2

| angle($w_{i,m}$) | $w_0^{(16,2)}$ | $w_1^{(16,2)}$ | $w_2^{(16,2)}$ | $w_3^{(16,2)}$ |
|---|---|---|---|---|
| $w_{0,m}$ | 0.004109 | 0.004109 | 0.004109 | 0.004109 |
| $w_{1,m}$ | 1.369535 | 2.940331 | −1.77206 | −0.20126 |
| $w_{2,m}$ | −2.58467 | 0.556918 | −2.58467 | 0.556918 |
| $w_{3,m}$ | −1.238 | −2.8088 | 1.90359 | 0.332793 |
| $w_{4,m}$ | 1.173554 | 1.173554 | 1.173554 | 1.173554 |
| $w_{5,m}$ | 3.138509 | −1.57388 | −0.00308 | 1.567713 |
| $w_{6,m}$ | 0.356941 | −2.78465 | 0.356941 | −2.78465 |
| $w_{7,m}$ | −3.13988 | 1.572512 | 0.001715 | −1.56908 |
| $w_{8,m}$ | −0.12551 | −0.12551 | −0.12551 | −0.12551 |
| $w_{9,m}$ | 3.140859 | −1.57153 | −0.00073 | 1.570063 |
| $w_{10,m}$ | 0.001151 | −3.14044 | 0.001151 | −3.14044 |
| $w_{11,m}$ | −2.46699 | 2.245401 | 0.674605 | −0.89619 |
| $w_{12,m}$ | 1.497674 | 1.497674 | 1.497674 | 1.497674 |
| $w_{13,m}$ | −0.13016 | 1.440635 | 3.011431 | −1.70096 |
| $w_{14,m}$ | −2.38034 | 0.76125 | −2.38034 | 0.76125 |
| $w_{15,m}$ | 2.32215 | 0.751353 | −0.81944 | −2.39024 |

TABLE 5

Beam codebook phase table $W^{(16,4)}$ when M = 16 and m = 4

| angle ($w_{i,m}$) | $w_0^{(16,4)}$ | $w_1^{(16,4)}$ | $w_2^{(16,4)}$ | $w_3^{(16,4)}$ | $w_4^{(16,4)}$ | $w_5^{(16,4)}$ | $w_6^{(16,4)}$ | $w_7^{(16,4)}$ |
|---|---|---|---|---|---|---|---|---|
| $w_{0,m}$ | −2.32902 | −2.32902 | −2.32902 | −2.32902 | −2.32902 | −2.32902 | −2.32902 | −2.32902 |
| $w_{1,m}$ | −0.72684 | 0.058557 | 0.843955 | 1.629353 | 2.414752 | −3.08304 | −2.29764 | −1.51224 |
| $w_{2,m}$ | 1.726359 | −2.98603 | −1.41523 | 0.155563 | 1.726359 | −2.98603 | −1.41523 | 0.155563 |
| $w_{3,m}$ | −1.83171 | 0.524482 | 2.880677 | −1.04631 | 1.30988 | −2.61711 | −0.26092 | 2.095279 |
| $w_{4,m}$ | 0.987884 | −2.15371 | 0.987884 | −2.15371 | 0.987884 | −2.15371 | 0.987884 | −2.15371 |
| $w_{5,m}$ | −2.70476 | 1.222226 | −1.13397 | 2.793023 | 0.436828 | −1.91937 | 2.007625 | −0.34857 |
| $w_{6,m}$ | 0.24525 | −1.32555 | −2.89634 | 1.816046 | 0.24525 | −1.32555 | −2.89634 | 1.816046 |
| $w_{7,m}$ | −3.12172 | 2.376065 | 1.590667 | 0.805269 | 0.019871 | −0.76553 | −1.55093 | −2.33632 |
| $w_{8,m}$ | 0.021047 | 0.021047 | 0.021047 | 0.021047 | 0.021047 | 0.021047 | 0.021047 | 0.021047 |
| $w_{9,m}$ | −2.89678 | −2.11139 | −1.32599 | −0.54059 | 0.244808 | 1.030206 | 1.815604 | 2.601002 |
| $w_{10,m}$ | 0.436683 | 2.00748 | −2.70491 | −1.13411 | 0.436683 | 2.00748 | −2.70491 | −1.13411 |
| $w_{11,m}$ | −2.15356 | 0.202633 | 2.558828 | 1.36816 | 0.988032 | −2.93896 | −0.58276 | 1.77343 |
| $w_{12,m}$ | 1.309601 | −1.83199 | 1.309601 | −1.83199 | 1.309601 | −1.83199 | 1.309601 | −1.83199 |
| $w_{13,m}$ | −1.41545 | 2.511536 | 0.155342 | −2.20085 | 1.726138 | −0.63006 | −2.98625 | 0.94074 |
| $w_{14,m}$ | 2.41475 | 0.843953 | −0.72684 | −2.29764 | 2.41475 | 0.843953 | −0.72684 | −2.29764 |
| $w_{15,m}$ | 0.812296 | 0.026898 | −0.7585 | −1.5439 | −2.3293 | −3.11469 | 2.383092 | 1.597694 |

TABLE 6

Phase table of a reference beam $w_8^{(16,8)}$ in a beam codebook phase table $W^{(16,8)}$ when M = 16 and m = 8

| angle($w_{i,m}$) | $w_8^{(16,8)}$ |
|---|---|
| $w_{0,m}$ | 1.48566 |
| $w_{1,m}$ | 2.35508 |
| $w_{2,m}$ | −3.0974 |
| $w_{3,m}$ | −2.8503 |
| $w_{4,m}$ | −2.596 |
| $w_{5,m}$ | −2.4662 |
| $w_{6,m}$ | −2.3933 |
| $w_{7,m}$ | −2.3912 |
| $w_{8,m}$ | −2.3912 |
| $w_{9,m}$ | −2.3933 |
| $w_{10,m}$ | −2.4662 |
| $w_{11,m}$ | −2.596 |
| $w_{12,m}$ | −2.8503 |
| $w_{13,m}$ | −3.0974 |
| $w_{14,m}$ | 2.35508 |
| $w_{15,m}$ | 1.48566 |

TABLE 7

Phase table of reference beams $w_{32}^{(32,2)}$, $w_{32}^{(32,4)}$, $w_{32}^{(32,8)}$, and $w_{32}^{(32,16)}$ in $W^{(32,2)}$, $W^{(32,4)}$, $W^{(32,8)}$, and $W^{(32,16)}$

| angle ($w_{i,m}$) | $w_2^{(32,2)}$ | $w_4^{(32,4)}$ | $w_8^{(32,8)}$ | $w_{16}^{(32,16)}$ |
|---|---|---|---|---|
| $w_{0,m}$ | −2.09151 | −0.18872 | −1.64511 | −0.87859 |
| $w_{1,m}$ | 2.396916 | −1.27429 | −2.69211 | −0.95418 |
| $w_{2,m}$ | 2.990607 | −2.40987 | 2.613634 | −0.9933 |
| $w_{3,m}$ | 2.759628 | −2.38158 | 2.619001 | −1.10009 |
| $w_{4,m}$ | 1.378956 | −3.0853 | 1.889638 | −2.43332 |
| $w_{5,m}$ | 1.043162 | 2.339379 | 1.749315 | −2.39316 |
| $w_{6,m}$ | 0.4486 | 1.502701 | 1.518584 | −2.48864 |
| $w_{7,m}$ | −0.48749 | 1.496761 | 1.255272 | −2.51397 |
| $w_{8,m}$ | −0.12855 | 0.409591 | 1.202516 | −2.60438 |
| $w_{9,m}$ | 0.209585 | 0.392387 | 0.898705 | −2.65822 |
| $w_{10,m}$ | 1.18186 | −0.45885 | 0.626391 | −2.74666 |
| $w_{11,m}$ | −2.47411 | −0.01319 | 0.496438 | −2.81305 |
| $w_{12,m}$ | 1.261557 | −0.07104 | 0.36631 | −2.90377 |
| $w_{13,m}$ | 1.141712 | −0.41108 | 0.238044 | −2.94992 |
| $w_{14,m}$ | 1.54101 | −0.43204 | 0.196097 | −2.98562 |
| $w_{15,m}$ | −1.44099 | −0.46641 | 0.125402 | −2.99875 |
| $w_{16,m}$ | −2.98037 | −0.46641 | 0.125402 | −2.99875 |
| $w_{17,m}$ | −3.12825 | −0.43204 | 0.196097 | −2.98562 |
| $w_{18,m}$ | −1.98384 | −0.41108 | 0.238044 | −2.94992 |
| $w_{19,m}$ | −1.04082 | −0.07104 | 0.36631 | −2.90377 |
| $w_{20,m}$ | −1.48209 | −0.01319 | 0.496438 | −2.81305 |
| $w_{21,m}$ | −1.5917 | −0.45885 | 0.626391 | −2.74666 |
| $w_{22,m}$ | −1.17638 | 0.392387 | 0.898705 | −2.65822 |

TABLE 7-continued

Phase table of reference beams $w_{32}^{(32,2)}$, $w_{32}^{(32,4)}$, $w_{32}^{(32,8)}$, and $w_{32}^{(32,16)}$ in $W^{(32,2)}$, $W^{(32,4)}$, $W^{(32,8)}$, and $W^{(32,16)}$

| angle ($w_{i,m}$) | $w_2^{(32,2)}$ | $w_4^{(32,4)}$ | $w_8^{(32,8)}$ | $w_{16}^{(32,16)}$ |
|---|---|---|---|---|
| $w_{23,m}$ | −1.128 | 0.409591 | 1.202516 | −2.60438 |
| $w_{24,m}$ | −0.00629 | 1.496761 | 1.255272 | −2.51397 |
| $w_{25,m}$ | 0.442729 | 1.502701 | 1.518584 | −2.48864 |
| $w_{26,m}$ | 2.460706 | 2.339379 | 1.749315 | −2.39316 |
| $w_{27,m}$ | −2.20354 | −3.0853 | 1.889638 | −2.43332 |
| $w_{28,m}$ | −1.475 | −2.38158 | 2.619001 | −1.10009 |
| $w_{29,m}$ | −1.09005 | −2.40987 | 2.613634 | −0.9933 |
| $w_{30,m}$ | −0.00539 | −1.27429 | −2.69211 | −0.95418 |
| $w_{31,m}$ | 0.578074 | −0.18872 | −1.64511 | −0.87859 |

Figure 2:
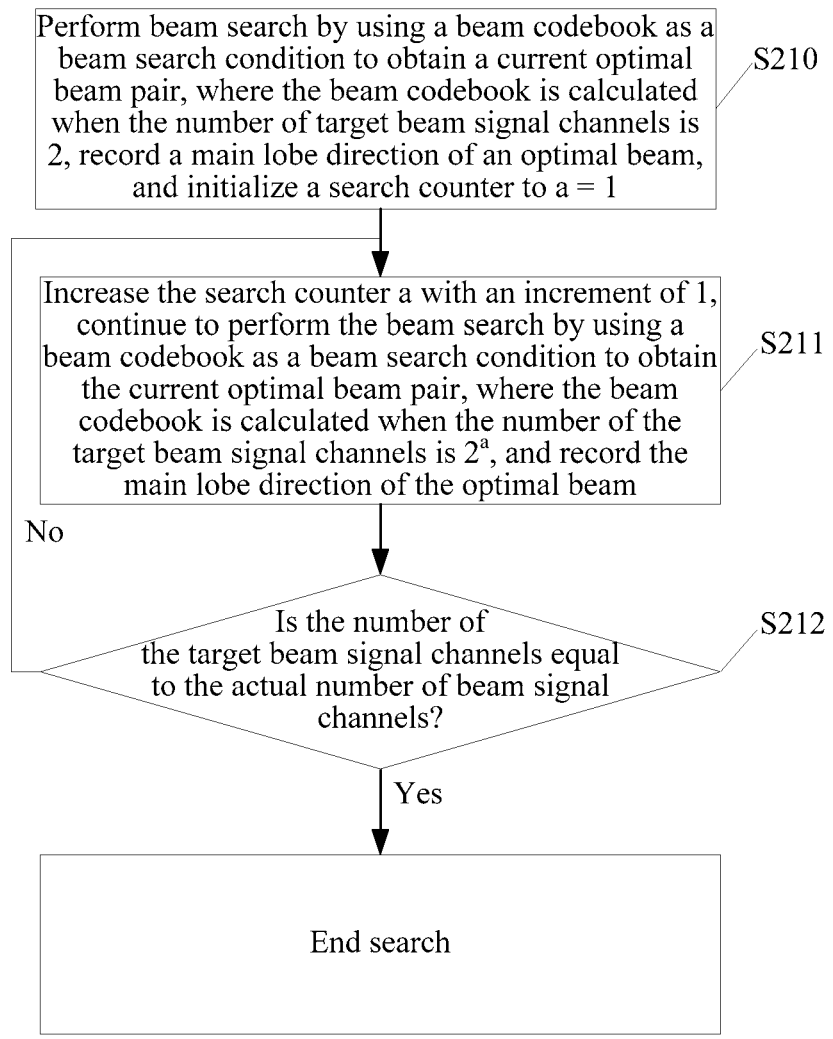
FIG. 2 is a schematic flowchart of a first embodiment of a beam search method according to the present invention.

FIG. 2 is a schematic flowchart of a first embodiment of a beam search method according to the present invention. In specific implementation, the beam search method of the present invention performs beam search by using a beam codebook generated according to the foregoing beam codebook generation method of the present invention. It can be learned from the beam codebook generation method of the present invention that, when the number of actually generated beam signal channels is M and the number of target beam signal channels is m, the beam codebook generation method of the present invention may be used to obtain:

$W^{(M,m)}$; when a value of m varies, different beam codebook matrices may be obtained. As shown in FIG. 2, the beam search method of the present invention may include the following steps:

Step S210: Perform beam search by using a beam codebook as a beam search condition to obtain a current optimal beam pair, where the beam codebook is calculated when the number of target beam signal channels is 2, record a main lobe direction of an optimal beam, and initialize a search counter to a=1.

It can be learned from the beam codebook generation method of the present invention that, in step S210, a beam codebook $W^{(M,2)}$ is used as a beam search condition for performing beam search.

Step S211: Increase the search counter a with an increment of 1, continue to perform the beam search by using a beam codebook as a beam search condition to obtain a current optimal beam pair, where the beam codebook is calculated when the number of the target beam signal channels is $2^a$, and record the main lobe direction of the optimal beam.

Step S212: Determine whether the number of the target beam signal channels is equal to the number of the actually generated beam signal channels; if a result of the determining is yes, end the search and use a current optimal beam pair, which is recorded when the search is ended, as an optimal beam pair; if the result of the determining is no, return to perform step S211.

It can be learned from the beam codebook generation method of the present invention that, in step S211, beam codebooks $W^{(M,4)}$, $W^{(M,8)}$, ..., $W^{(M,M/2)}$ are used successively as a beam search condition for performing beam search.

To better implement each solution of the method embodiment of the present invention, the embodiments of the present invention further provide related apparatuses.

Figure 3:
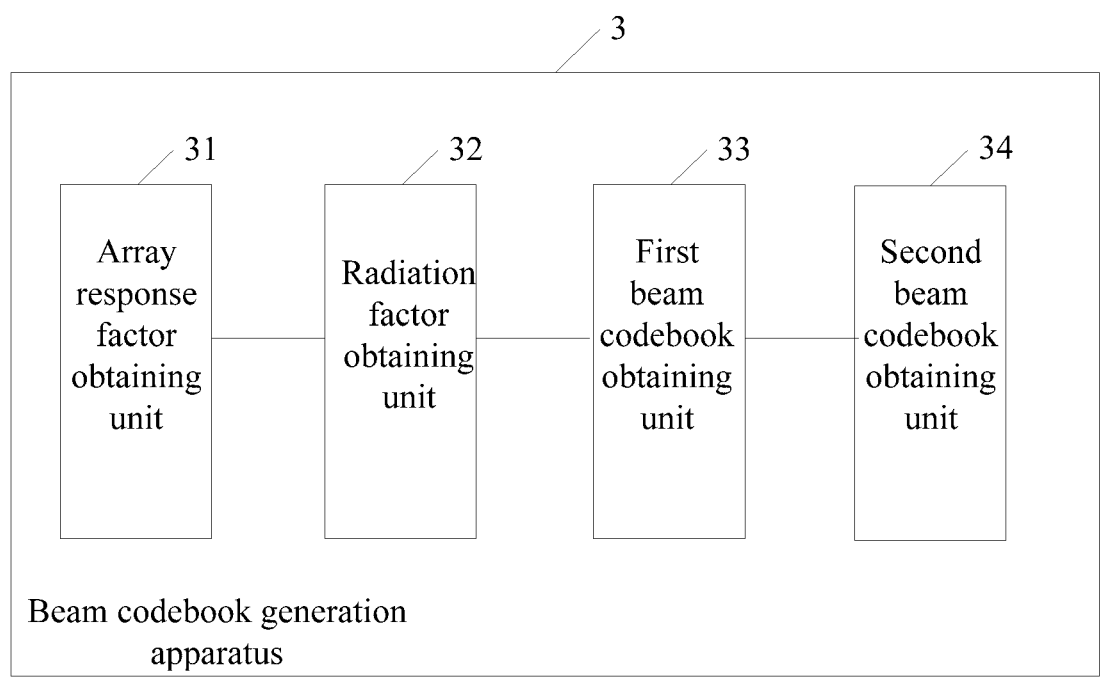
FIG. 3 is a schematic diagram of structural composition of a first embodiment of a beam codebook generation apparatus according to the present invention.

FIG. 3 is a schematic diagram of structural composition of a first embodiment of a beam codebook generation apparatus applicable to implementation of the method embodiment of the present invention according to the present invention. As shown in FIG. 3, the beam codebook generation apparatus 3 of the present invention may include an array response factor obtaining unit 31, a radiation factor obtaining unit 32, a first beam codebook obtaining unit 33, and a second beam codebook obtaining unit 34, where the array response factor obtaining unit 31 is configured to calculate a first array response factor of a reference beam with a specified sequence number in target beams according to the number of actually generated beam signal channels, and calculate a second array response factor of the reference beam in the target beams according to the preset number of target beam signal channels;

the radiation factor obtaining unit 32 is configured to perform radiated power normalization processing on the first array response factor, which is obtained by the array response factor obtaining unit 31, to obtain a first radiation factor of the reference beam, and perform radiated power normalization processing on the second array response factor, which is obtained by the array response factor obtaining unit 31, to obtain a second radiation factor of the reference beam;

the first beam codebook obtaining unit 33 is configured to perform normalization processing on the first radiation factor and the second radiation factor of the reference beam, which are obtained by the radiation factor obtaining unit 32, to obtain a beam codebook of the reference beam; and the second beam codebook obtaining unit 34 is configured to perform rotation processing on the beam codebook of the reference beam to obtain a beam codebook of one or more other beams except the reference beam in the target beams, where the beam codebook of the reference beam is obtained by the first beam codebook obtaining unit 33.

Optionally, the beam codebook generation apparatus of the present invention further includes a setting unit, which is configured to set the number of the target beam signal channels and the sequence number of the reference beam.

In some feasible embodiments, the beam signal channels in the present invention may be antenna array element channels or filter channels or other beam signal channels that are formed by other devices capable of generating beam channels, and an antenna array element may be an antenna array element formed of phased array antennas. When beam signal channels are antenna array element channels, the number of the beam signal channels may be the number of antenna array elements.

In some feasible embodiments, the value of the number of the target beam signal channels, which is set in the present invention, may be less than or equal to the number of the actually generated beam signal channels. For example, using the number of antenna array elements as an example for description, and assuming that the number of actual antenna array elements is M (M is a positive integer) and the set number of the target antenna array elements is m (m is a positive integer), in some feasible embodiments, m and M may satisfy a condition: m<M.

In some feasible embodiments, the number of the target beams corresponds to the set number of the target beam signal channels. Generally, the number of the target beams may be less than or equal to twice of the number of the target beam signal channels, and the sequence number of the reference beam in the target beams may be less than or equal to the number of the target beam signal channels. For example, description is given by using an example in which the number of the actual antenna array elements is M (M is a positive integer), the number of the target antenna array elements is m (m is a positive integer), the number of the target beams are K (K is a positive integer), and the sequence number of the reference beam is i, in some feasible embodiments, K≤2m and i≤m.

In some feasible embodiments, a method for calculating the first array response factor of the reference beam in the target beams by the array response factor obtaining unit 31 according to the number of the actually generated beam signal channels may be expressed by formula (2):

$$AF_i^{(M,m)} = w_i^H a(\theta) = \sum_{p=0}^{M-1} w_{p,i}^* e^{j\frac{d}{\lambda}2\pi p \sin\theta}. \qquad (2)$$

In formula (2), i is the sequence number of the reference beam (as described above, in some feasible embodiments, i may satisfy: i≤m), $W_i$ is an array weighted vector of the reference beam in a beam codebook matrix, H and * indicate conjugate transpose and conjugate respectively, p is a sequence number of an actually generated beam signal channel, where values of p are 0, 1, ..., M−1 successively, M is the number of the actually generated beam signal channels, m is the set number of the target beam signal channels (as described above, in some feasible embodiments, m may satisfy: m<M), θ is an angle of direction of arrival, a(θ) is a steering vector of a received signal, and d and λ are array element spacing and a carrier wavelength respectively.

In some feasible embodiments, $w_{p,i}$ may be obtained according to formula (1) or another known array weighted vector calculation method, which is not detailed here.

In some feasible embodiments, a method for calculating the second array response factor of the reference beam in the target beams by the array response factor obtaining unit 31 according to the number of the actually generated beam signal channels may be expressed by formula (3):

$$AF_i^{(m)} = w_i^H a(\theta) = \sum_{q=0}^{m-1} w_{q,i}^* e^{j\frac{d}{\lambda}2\pi p \sin\theta}. \qquad (3)$$

In formula (3), i is the sequence number of the reference beam (as described above, in some feasible embodiments, i may satisfy: i≤m), $W_i$ is the array weighted vector of the reference beam in the beam codebook matrix, H and * indicate conjugate transpose and conjugate respectively, q is a sequence number of a target beam signal channel, where values of q are 0, 1, ..., m−1 successively, m is the set number of the target beam signal channels (as described above, in some feasible embodiments, m may satisfy: m<M), θ is the angle of direction of arrival, a(θ) is the steering vector of the received signal, and d and λ are the array element spacing and the carrier wavelength respectively.

In some feasible embodiments, $w_{q,i}$ may be obtained according to formula (1) or another known array weighted vector calculation method, which is not detailed here.

In some feasible embodiments, a method for performing radiated power normalization processing on the first array response factor by the radiation factor obtaining unit 32 to obtain a first radiation factor of the reference beam may be expressed by formula (4):

$$G_i^{(M,m)} = \frac{\|AF_i^{(M,m)}\|^2}{m \times \int \|AF_i^{(M,m)}\|^2 d\theta}. \quad (4)$$

In formula (4), i is the sequence number of the reference beam (as described above, in some feasible embodiments, i may satisfy: i≤m), $AF_i^{(M,m)}$ is the first array response factor of the reference beam, m is the set number of the target beam signal channels (as described above, in some feasible embodiments, m may satisfy: m<M), θ is the angle of direction of arrival, and d is the array element spacing expressed by the carrier wavelength.

In some feasible embodiments, a method for performing radiated power normalization processing on the second array response factor by the radiation factor obtaining unit 32 to obtain a second radiation factor of the reference beam may be expressed by formula (5):

$$\mathcal{G}_i^{(m)} = \frac{\|AF_i^{(m)}\|^2}{m \times \int \|AF_i^{(m)}\|^2 d\theta}. \quad (5)$$

In formula (5), i is the sequence number of the reference beam (as described above, in some feasible embodiments, i may satisfy: i≤m), $AF_i^{(m)}$ is the second array response factor of the reference beam, m is the set number of the target beam signal channels (as described above, in some feasible embodiments, m may satisfy: m<M), θ is the angle of direction of arrival, and d is the array element spacing expressed by the carrier wavelength.

In some feasible embodiments, a method for performing normalization processing on the obtained first radiation factor and second radiation factor of the reference beam by the first beam codebook obtaining unit 33 to obtain a beam codebook of the reference beam may be expressed by formula (6):

$$w_i^{(M,m)} \arg\min_{|w_{p,m}|=1} \left\{ \int_0^{2\pi} |\mathcal{G}_i^{(m)} - G_i^{(M,m)}|^2 d\theta \right\}. \quad (6)$$

In formula (6), i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), p is the sequence number of the actually generated beam signal channel, where values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates the phase control condition, that is, the beam codebook performs only phase rotation for a signal without performing amplitude adjustment.

In some feasible embodiments, a method for performing normalization processing on the obtained first radiation factor and second radiation factor of the reference beam by the first beam codebook obtaining unit 33 to obtain a beam codebook of the reference beam may be expressed by formula (7):

$$w_i^{(M,m)} \arg\min_{|w_{p,i}|=1} \left\{ \int_0^{2\pi} |\mathcal{G}_i^{(m)} - G_i^{(M,m)}| d\theta \right\}. \quad (7)$$

In formula (7), i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), p is the sequence number of the actually generated beam signal channel, where values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition, that is, the beam codebook performs only phase rotation for a signal without performing amplitude adjustment.

In some feasible embodiments, a method for performing normalization processing on the obtained first radiation factor and second radiation factor of the reference beam by the first beam codebook obtaining unit 33 to obtain a beam codebook of the reference beam may be expressed by formula (8):

$$w_i^{(M,m)} \arg\min\left\{ \int_0^{2\pi} |\mathcal{G}_i^{(m)} - G_i^{(M,m)}|^2 d\theta \right\}. \quad (8)$$

In formula (8), i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), p is the sequence number of the actually generated beam signal channel, where values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, and d is the array element spacing expressed by the carrier wavelength.

In some feasible embodiments, a method for performing rotation processing on the obtained beam codebook of the reference beam by the second beam codebook obtaining unit 34 to obtain a beam codebook of one or more other beams except the reference beam in the target beams may be expressed by formula (9):

$$\text{angle}(w_{p,r}) = \text{angle}(w_{p,i}) + p\frac{q-m}{2m}\pi. \quad (9)$$

In formula (9), p is the sequence number of the actually generated beam signal channel, i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), K is the number of the target beams (as described above, in some feasible embodiments, K may satisfy: K≤2m), r is the sequence number of the target beam, values of p are 0, 1, . . . , M−1 successively, values of r are 0, 1, . . . , i−1, i+1, . . . , K−1 successively, and angle($w_{p,i}$) is a phase value of the beam codebook of the reference beam.

In specific implementation, after the processing is performed by the beam codebook generation apparatus of the present invention, calculated beam codebooks of all the K target beams may form a codebook matrix $W^{(M,m)}$.

Figure 4:
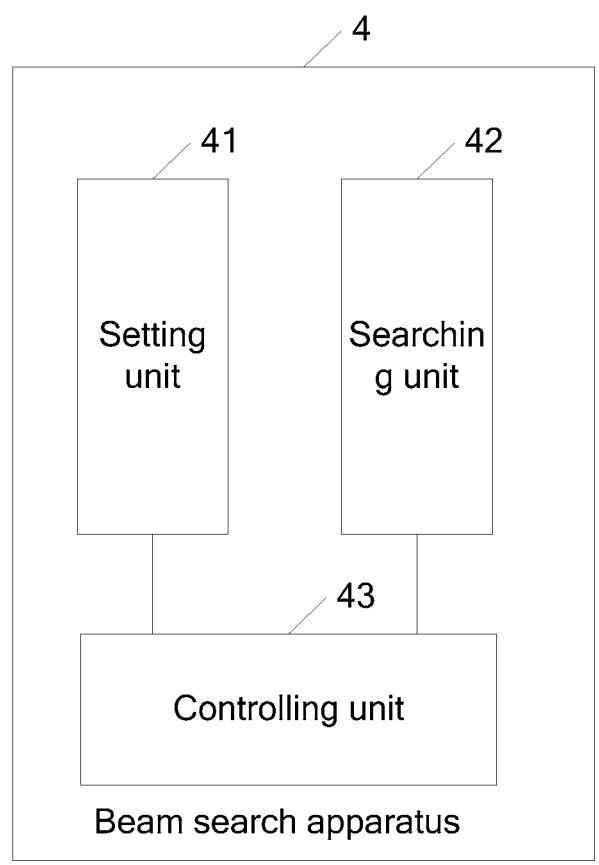
FIG. 4 is a schematic diagram of structural composition of a first embodiment of a beam search apparatus according to the present invention.

FIG. 4 is a schematic diagram of structural composition of a first embodiment of a beam search apparatus 4 applicable to implementation of the method embodiment of the present invention according to the present invention. As shown in FIG. 4, the beam search apparatus 4 of the present invention may include a setting unit 41, a searching unit 42, and a controlling unit 43, where:

the setting unit 41 is configured to set a search counter and initialize the search counter to a=1;

the searching unit 42 is configured to: perform beam search by using a beam codebook as a beam search condition to obtain a current optimal beam pair, where the beam codebook is generated by a beam codebook generation apparatus when the number of target beam signal channels are 2a, where the beam codebook generation apparatus is provided in this embodiment of present invention; and record a main lobe direction of an optimal beam; and the controlling unit 43 is configured to: after each time the searching unit 42 performs the beam search by using the beam codebook as the beam search condition, where the beam codebook is generated when the number of target beam signal channels are $2^a$, control the setting unit 41 to increase the search counter with an increment of 1, and determine whether the number of the target beam signal channels obtained after the increase of the search counter is equal to the number of actually generated beam signal channels, and, if a result of the determining is yes, instruct the searching unit 42 to continue to perform the beam search by using the beam codebook as the beam search condition, where the beam codebook is generated when the number of target beam signal channels are $2^a$, and, if the result of the determining is no, instruct the searching unit 42 to end the search, and use a current optimal beam pair, which is recorded when the search is ended, as an optimal beam pair.

It can be learned from the beam codebook generation method and apparatus of the present invention that, when the number of actually generated beam signal channels is M and the number of target beam signal channels is m, the beam codebook generation method and apparatus of the present invention may be used to obtain:

$W^{(M,m)}$; when a value of m varies, different beam codebook matrices may be obtained. The searching unit 42 uses beam codebooks $W^{(M,4)}$, $W^{(M,8)}$, . . . , $W^{(M,M/2)}$ as a beam search condition successively for performing beam search.

Figure 5:
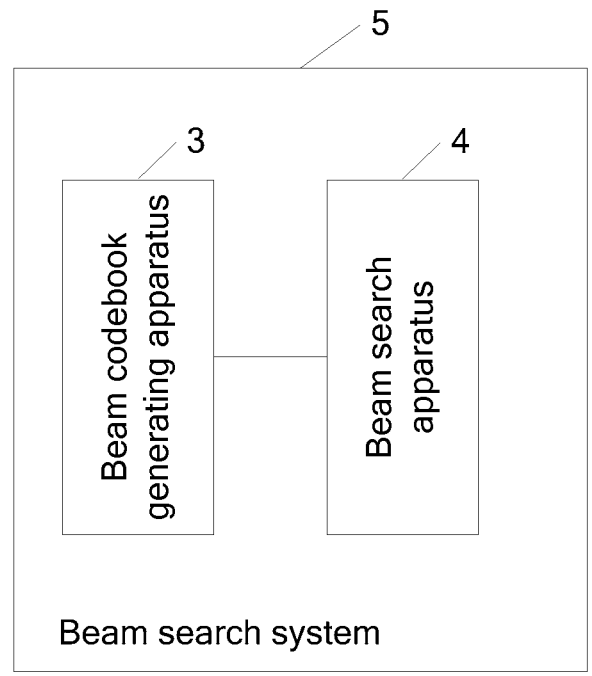
FIG. 5 is a schematic diagram of structural composition of a first embodiment of a beam search system according to the present invention.

FIG. 5 is a schematic diagram of structural composition of a first embodiment of a beam search system 5 according to the present invention. As shown in FIG. 5, the beam search system 5 of the present invention may include the beam codebook generation apparatus 3 of the present invention and the beam codebook search apparatus 4 of the present invention, where structures and features of the beam codebook generation apparatus 3 and the beam codebook search apparatus 4 are the same as those described in the foregoing embodiments and are not described repeatedly here.

It can be learned from the foregoing description that, in some feasible implementation manners of the present invention, the number of target beam signal channels is set, and a beam codebook is calculated based on the number of actually generated beam signal channels and the set number of the target beam signal channels, where the beam codebook is generated under a circumstance of the number of the actually generated beam signal channels, where the circumstance is equivalent to a circumstance of the number of the target beam signal channels, so that when beam search is performed by using the generated beam codebook, all actual beam signal channels may be used, and it is unnecessary to perform activation and deactivation control on a single beam signal channel, which reduces hardware implementation difficulty.

In specific implementation, the present invention further provides a computer storage medium, where the computer storage medium may store a program, and, when the program is executed, some or all of the steps of each embodiment of the beam codebook generation method provided in the present invention may be performed.

In specific implementation, the present invention further provides a computer storage medium, where the computer storage medium may store a program, and, when the program is executed, some or all of the steps of each embodiment of the beam codebook search method provided in the present invention may be performed.

Figure 6:
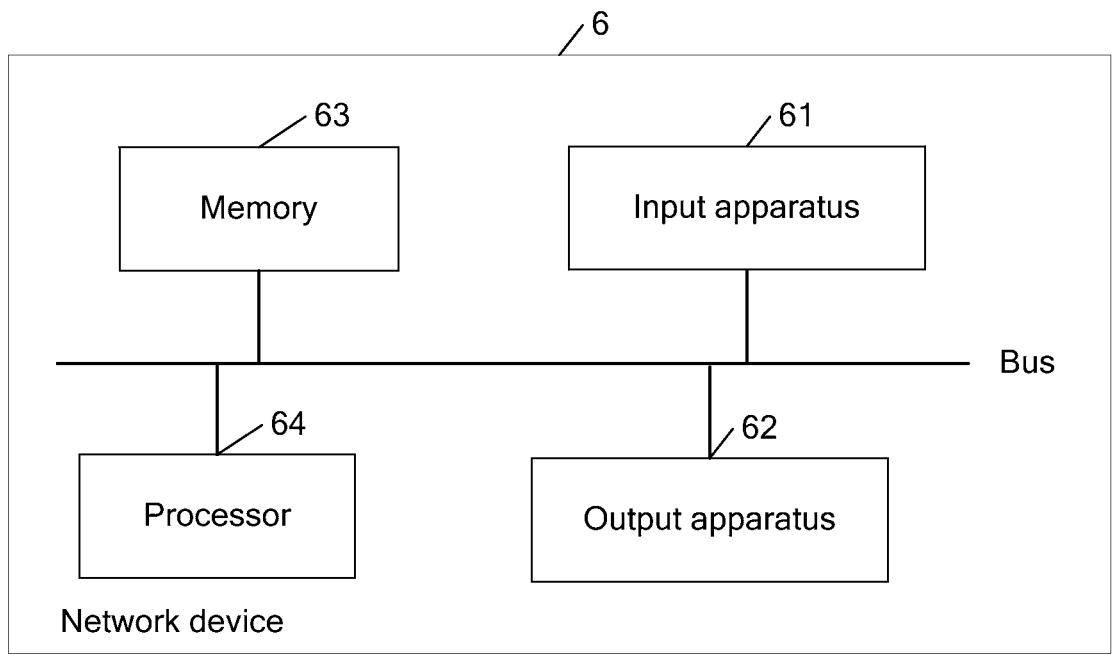
FIG. 6 is a schematic diagram of structural composition of an embodiment of a network device according to the present invention.

In specific implementation, as shown in FIG. 6, the present invention further provides a network device 6, which may include: an input apparatus 61, an output apparatus 62, a memory 63, and a processor 64 (in specific implementation, there may be multiple processors 64 of the network device 6, and only one processor is given in FIG. 6 as an example for description).

In some feasible embodiments of the present invention, the input apparatus 61, the output apparatus 62, the memory 63, and the processor 64 may be connected by using a bus or by other manners, and bus connection is used as an example in FIG. 6.

In some feasible embodiments of the present invention, the processor 64 may perform the following steps:

calculating a first array response factor of a reference beam with a specified sequence number in target beams according to the number of actually generated beam signal channels, and calculating a second array response factor of the reference beam in the target beams according to the preset number of target beam signal channels;

performing radiated power normalization processing on the first array response factor to obtain a first radiation factor of the reference beam, and performing radiated power normalization processing on the second array response factor to obtain a second radiation factor of the reference beam;

performing normalization processing on the obtained first radiation factor and second radiation factor of the reference beam to obtain a beam codebook of the reference beam; and performing rotation processing on the obtained beam codebook of the reference beam to obtain a beam codebook of one or more other beams except the reference beam in the target beams.

In some feasible embodiments, the memory 63 stores information such as the number of the target beam signal channels and the sequence number of the reference beam, which need to be used by the processor 64. In some feasible embodiments, a value of the number of the target beam signal channels is less than or equal to the number of the actually generated beam signal channels, and the sequence number of the reference beam in the target beams is less than or equal to the number of the target beam signal channels.

In some feasible embodiments, a method for calculating the first array response factor of the reference beam in the target beams by the processor 64 according to the number of the actually generated beam signal channels may be expressed by formula (2):

$$AF_i^{(M,m)} = w_i^H a(\theta) = \sum_{p=0}^{M-1} w_{p,i}^* e^{j\frac{d}{\lambda}2\pi p \sin\theta}. \quad (2)$$

In formula (2), i is the sequence number of the reference beam (as described above, in some feasible embodiments, i may satisfy: i≤m), $W_i$ is an array weighted vector of the reference beam in a beam codebook matrix, H and * indicate conjugate transpose and conjugate respectively, p is a sequence number of an actually generated beam signal channel, where values of p are 0, 1, . . . , M−1 successively, M is the number of the actually generated beam signal channels, m is the set number of the target beam signal channels (as described above, in some feasible embodiments, m may satisfy: m<M), θ is an angle of direction of arrival, a(θ) is a steering vector of a received signal, and d and λ are array element spacing and a carrier wavelength respectively.

In some feasible embodiments, $w_{p,i}$ may be obtained according to formula (1) or another known array weighted vector calculation method, which is not detailed here.

In some feasible embodiments, a method for calculating the second array response factor of the reference beam in the target beams by the processor 64 according to the number of the actually generated beam signal channels may be expressed by formula (3):

$$AF_i^{(m)} = w_i^H a(\theta) = \sum_{q=0}^{M-1} w_{q,i}^* e^{j\frac{d}{\lambda}2\pi p \sin\theta}. \quad (3)$$

In formula (3), i is the sequence number of the reference beam (as described above, in some feasible embodiments, i may satisfy: i≤m), $W_i$ is the array weighted vector of the reference beam in the beam codebook matrix, H and * indicate conjugate transpose and conjugate respectively, q is a sequence number of a target beam signal channel, where values of q are 0, 1, . . . , m−1 successively, m is the set number of the target beam signal channels (as described above, in some feasible embodiments, m may satisfy: m<M), θ is the angle of direction of arrival, a(θ) is the steering vector of the received signal, and d and λ are the array element spacing and the carrier wavelength respectively.

In some feasible embodiments, $w_{q,i}$ may be obtained according to formula (1) or another known array weighted vector calculation method, which is not detailed here.

In some feasible embodiments, a method for performing radiated power normalization processing on the first array response factor by the processor 64 to obtain a first radiation factor of the reference beam may be expressed by formula (4):

$$G_i^{(M,m)} = \frac{\|AF_i^{(M,m)}\|^2}{m \times \int \|AF_i^{(M,m)}\|^2 d\theta}. \quad (4)$$

In formula (4), i is the sequence number of the reference beam (as described above, in some feasible embodiments, i may satisfy: i≤m), $AF_i^{(M,m)}$ is the first array response factor of the reference beam, m is the set number of the target beam signal channels (as described above, in some feasible embodiments, m may satisfy: m<M), θ is the angle of direction of arrival, and d is the array element spacing expressed by the carrier wavelength.

In some feasible embodiments, a method for performing radiated power normalization processing on the second array response factor by the processor 64 to obtain a second radiation factor of the reference beam may be expressed by formula (5):

$$\mathcal{G}_i^{(m)} = \frac{\|AF_i^{(m)}\|^2}{m \times \int \|AF_i^{(m)}\|^2 d\theta}. \quad (5)$$

In formula (5), i is the sequence number of the reference beam (as described above, in some feasible embodiments, i may satisfy: i≤m), $AF_i^{(m)}$ is the second array response factor of the reference beam, m is the set number of the target beam signal channels (as described above, in some feasible embodiments, m may satisfy: m<M), θ is the angle of direction of arrival, and d is the array element spacing expressed by the carrier wavelength.

In some feasible embodiments, a method for performing normalization processing on the obtained first radiation factor and second radiation factor of the reference beam by the processor 64 to obtain a beam codebook of the reference beam may be expressed by formula (6):

$$w_i^{(M,m)} \arg\min_{|w_{p,m}|=1} \left\{ \int_0^{2\pi} |\mathcal{G}_i^{(m)} - G_i^{(M,m)}|^2 d\theta \right\}. \quad (6)$$

In formula (6), i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), p is the sequence number of the actually generated beam signal channel, where values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates the phase control condition, that is, the beam codebook performs only phase rotation for a signal without performing amplitude adjustment.

In some feasible embodiments, a method for performing normalization processing on the obtained first radiation factor and second radiation factor of the reference beam by the processor 64 to obtain a beam codebook of the reference beam may be expressed by formula (7):

$$w_i^{(M,m)} \arg\min_{|w_{p,i}|=1} \left\{ \int_0^{2\pi} |\mathcal{G}_i^{(m)} - G_i^{(M,m)}| d\theta \right\}. \quad (7)$$

In formula (7), i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), p is the sequence number of the actually generated beam signal channel, where values of p are 0, 1, ..., M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition, that is, the beam codebook performs only phase rotation for a signal without performing amplitude adjustment.

In some feasible embodiments, a method for performing normalization processing on the obtained first radiation factor and second radiation factor of the reference beam by the processor 64 to obtain a beam codebook of the reference beam may be expressed by formula (8):

$$w_i^{(M,m)} \arg\min\left\{ \int_0^{2\pi} |\mathcal{G}_i^{(m)} - G_i^{(M,m)}|^2 d\theta \right\}. \tag{8}$$

In formula (8), i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), p is the sequence number of the actually generated beam signal channel, where values of p are 0, 1, ..., M−1 successively, $\mathcal{G}_i^{(m)}$ is the second radiation factor of the reference beam, $G_i^{(M,m)}$ is the first radiation factor of the reference beam, θ is the angle of direction of arrival, and d is the array element spacing expressed by the carrier wavelength.

In some feasible embodiments, a method for performing rotation processing on the obtained beam codebook of the reference beam by the processor 64 to obtain a beam codebook of one or more other beams except the reference beam in the target beams may be expressed by formula (9):

$$\text{angle}(w_{p,r}) = \text{angle}(w_{p,i}) + p\frac{q-m}{2m}\pi. \tag{9}$$

In formula (9), p is the sequence number of the actually generated beam signal channel, i is the sequence number of the reference beam (as described above, in some feasible embodiments, i may satisfy: i≤m), M is the number of the actually generated beam signal channels, m is the set number of the target beam signal channels (as described above, in some feasible embodiments, m may satisfy: m<M), K is the number of the target beams (as described above, in some feasible embodiments, K may satisfy: K≤2m), r is the sequence number of the target beam, values of p are 0, 1, ..., M−1 successively, values of r are 0, 1, ..., i−1, i+1, ..., K−1 successively, and angle($w_{p,i}$) is a phase value of the beam codebook of the reference beam.

It can be learned from the foregoing description that, in some feasible implementation manners of the present invention, a network device 6 sets the number of target beam signal channels, and calculates a beam codebook based on the number of actually generated beam signal channels and the set number of the target beam signal channels, where the beam codebook is generated under a circumstance of the number of the actually generated beam signal channels, where the circumstance is equivalent to a circumstance of the number of the target beam signal channels, so that when beam search is performed by using the generated beam codebook, all actual beam signal channels may be used, and it is unnecessary to perform activation and deactivation control on a single beam signal channel, which reduces hardware implementation difficulty.

Figure 7:
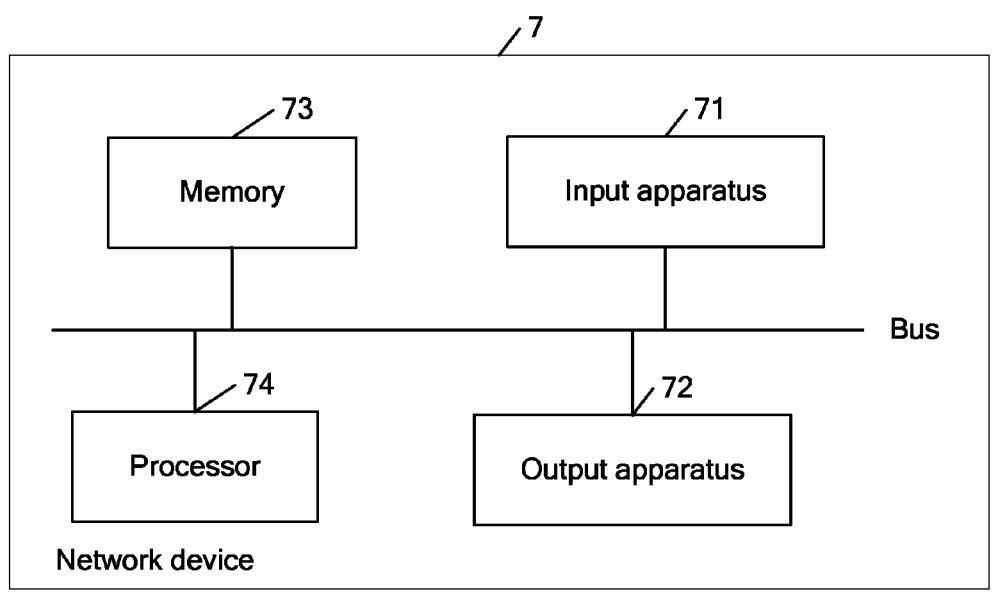
FIG. 7 is a schematic diagram of structural composition of an embodiment of a network device according to the present invention.

In specific implementation, as shown in FIG. 7, the present invention further provides a network device 7, which may include: an input apparatus 71, an output apparatus 72, a memory 73, and a processor 74 (in specific implementation, the processors 74 of the network device 7 may be plural, and only one processor is given in FIG. 7 as an example for description).

In some feasible embodiments of the present invention, the input apparatus 71, the output apparatus 72, the memory 73, and the processor 74 may be connected by using a bus or by other manners, and bus connection is used as an example in FIG. 7.

In some feasible embodiments of the present invention, the processor 74 may perform the following steps:

(1) performing beam search by using a beam codebook as a beam search condition to obtain a current optimal beam pair, where the beam codebook is calculated when the number of target beam signal channels is 2, recording a main lobe direction of an optimal beam, and initializing a search counter to a=1; it can be learned from the beam codebook generation method of the present invention that, in this step, a beam codebook $W^{(M,2)}$ is used as a beam search condition for performing beam search;

(2) increasing the search counter a with an increment of 1, continuing to perform the beam search by using a beam codebook as a beam search condition to obtain a current optimal beam pair, where the beam codebook is calculated when the number of the target beam signal channels is $2^a$, and recording the main lobe direction of the optimal beam; and (3) determining whether the number of the target beam signal channels is equal to the number of actually generated beam signal channels; if a result of the determining is yes, ending the search and using a current optimal beam pair, which is recorded when the search is ended, as an optimal beam pair; if the result of the determining is no, returning to perform step (2).

It can be learned from the beam codebook generation method of the present invention that, in step (2), beam codebooks $W^{(M,4)}, W^{(M,8)}, \ldots, W^{(M,M/2)}$ are used successively as a beam search condition for performing beam search.

It can be learned from the foregoing description that, in some feasible implementation manners of the present invention, when a network device 7 performs beam search by using a beam codebook generated according to the beam generation method of the present invention, all actual beam signal channels may be used, and it is unnecessary to perform activation and deactivation control on a single beam signal channel, which reduces hardware implementation difficulty.

What are enumerated above are merely exemplary embodiments of the present invention, and certainly, are not intended to limit the protection scope of the present invention. Any equivalent variations made according to the claims of the present invention shall still fall within the scope of the present invention.

What is claimed is:

1. A beam codebook generation method, comprising:
 calculating a first array response factor of a reference beam with a specified sequence number in target beams according to the number of actually generated beam signal channels, and calculating a second array response factor of the reference beam in the target beams according to the preset number of target beam signal channels;

performing radiated power normalization processing on the first array response factor to obtain a first radiation factor of the reference beam, and performing radiated power normalization processing on the second array response factor to obtain a second radiation factor of the reference beam;

performing normalization processing on the obtained first radiation factor and second radiation factor of the reference beam to obtain a beam codebook of the reference beam; and performing rotation processing on the obtained beam codebook of the reference beam to obtain a beam codebook of one or more other beams except the reference beam in the target beams.

2. The beam codebook generation method according to claim 1, wherein a value of the number of the target beam signal channels is less than or equal to the number of the actually generated beam signal channels.

3. The beam codebook generation method according to claim 1, wherein the number of the target beams is less than or equal to twice of the number of the target beam signal channels, and the sequence number of the reference beam in the target beams is less than or equal to the number of the target beam signal channels.

4. The beam codebook generation method according to claim 1, the calculating a first array response factor of a reference beam with a specified sequence number in target beams according to the number of actually generated beam signal channels comprises:

calculating the first array response factor of the reference beam in the target beams according to a formula $$AF_i^{(M,m)} = w_i^H a(\theta) = \sum_{q=0}^{M-1} w_{p,i}^* e^{j\frac{d}{\lambda}2\pi p \sin\theta},$$

wherein
i is the sequence number of the reference beam, $AF_i^{(M,m)}$ is a first array response factor of a reference beam with a sequence number i, $W_i$ is an array weighted vector of the reference beam in a beam codebook matrix, p is a sequence number of an actually generated beam signal channel, M is the number of the actually generated beam signal channels, m is the set number of target beam signal channels, $\theta$ is an angle of direction of arrival, $a(\theta)$ is a steering vector of a received signal, and d and $\lambda$ are array element spacing and a carrier wavelength respectively; and the calculating a second array response factor of the reference beam in the target beams according to the preset number of target beam signal channels comprises:

calculating the second array response factor of the reference beam in the target beams according to a formula $$AF_i^{(m)} = w_i^H a(\theta) = \sum_{q=0}^{m-1} w_{q,i}^* e^{j\frac{d}{\lambda}2\pi p \sin\theta},$$

wherein
i is the sequence number of the reference beam, $AF_i^{(m)}$ is a second array response factor of the reference beam with the sequence number i, $W_i$ is the array weighted vector of the reference beam in the beam codebook matrix, H and * indicate conjugate transpose and conjugate respectively, q is a sequence number of a target beam signal channel, wherein values of q are 0, 1, . . . , m−1 successively, m is the set number of the target beam signal channels, $\theta$ is the angle of direction of arrival, $a(\theta)$ is the steering vector of the received signal, and d and $\lambda$ are the array element spacing and the carrier wavelength respectively.

5. The beam codebook generation method according to claim 4, wherein the performing radiated power normalization processing on the first array response factor to obtain a first radiation factor of the reference beam comprises:

calculating the first radiation factor of the reference beam according to a formula $$G_i^{(M,m)} = \frac{\|AF_i^{(M,m)}\|^2}{m \times \int \|AF_i^{(M,m)}\|^2 d\theta},$$

wherein
i is the sequence number of the reference beam, $G_i^{(M,m)}$ is a first radiation factor of the reference beam with the sequence number i, $AF_i^{(M,m)}$ is the first array response factor of the reference beam, m is the set number of the target beam signal channels, $\theta$ is the angle of direction of arrival, and d is the array element spacing expressed by the carrier wavelength; and the performing radiated power normalization processing on the second array response factor to obtain a second radiation factor of the reference beam comprises:

calculating the second radiation factor of the reference beam according to a formula $$\mathcal{G}_i^{(m)} = \frac{\|AF_i^{(m)}\|^2}{m \times \int \|AF_i^{(m)}\|^2 d\theta},$$

wherein
i is the sequence number of the reference beam, $\mathcal{G}_i^{(m)}$ is a second radiation factor of the reference beam with the sequence number i, $AF_i^{(m)}$ is the second array response factor of the reference beam, m is the set number of the target beam signal channels, $\theta$ is the angle of direction of arrival, and d is the array element spacing expressed by the carrier wavelength.

6. The beam codebook generation method according to claim 5, wherein the performing normalization processing on the obtained first radiation factor and second radiation factor of the reference beam to obtain a beam codebook of the reference beam comprises:

calculating the beam codebook of the reference beam according to a formula $$w_i^{(M,m)} = \underset{\|w_{p,i}\|=1}{\arg\min}\left\{\int_0^{2\pi} |\mathcal{G}_i^{(m)} - G_i^{(M,m)}|^2 d\theta\right\},$$

wherein
i is the sequence number of the reference beam, $w_i^{(M,m)}$ is a beam codebook of the reference beam with the sequence number i, M is the number of the actually generated beam signal channels, m is the set number of the target beam signal channels, p is the sequence number of the actually generated beam signal channel, wherein values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition.

7. The beam codebook generation method according to claim 5, wherein the performing normalization processing on the obtained first radiation factor and second radiation factor of the reference beam to obtain a beam codebook of the reference beam comprises:
calculating the beam codebook of the reference beam according to a formula $$w_i^{(M,m)} = \underset{|w_{p,i}|=1}{\operatorname{argmin}}\left\{\int_0^{2\pi} |\mathcal{G}_i^{(m)} - G_i^{(M,m)}|\, d\theta\right\},$$

wherein
i is the sequence number of the reference beam, $w_i^{(M,m)}$ is a beam codebook of the reference beam with the sequence number i, M is the number of the actually generated beam signal channels, m is the set number of the target beam signal channels, p is the sequence number of the actually generated beam signal channel, wherein values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition.

8. The beam codebook generation method according to claim 5, wherein the performing normalization processing on the obtained first radiation factor and second radiation factor of the reference beam to obtain a beam codebook of the reference beam comprises:
calculating the beam codebook of the reference beam according to a formula $$w_i^{(M,m)} = \underset{|w_{p,i}|=1}{\operatorname{argmin}}\left\{\int_0^{2\pi} |\mathcal{G}_i^{(m)} - G_i^{(M,m)}|^2\, d\theta\right\},$$

wherein
i is the sequence number of the reference beam, $w_i^{(M,m)}$ is the beam codebook of the reference beam with the sequence number i, M is the number of the actually generated beam signal channels, m is the set number of the target beam signal channels, p is the sequence number of the actually generated beam signal channel, wherein values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, and d is the array element spacing expressed by the carrier wavelength.

9. The beam codebook generation method according to claim 5, wherein the performing rotation processing on the obtained beam codebook of the reference beam to obtain a beam codebook of one or more other beams except the reference beam in the target beams comprises:
calculating the beam codebook of one or more other beams except the reference beam in the target beams according to a formula $$\operatorname{angle}(w_{p,r}) = \operatorname{angle}(w_{p,i}) + p\frac{q-m}{2m}\pi,$$

wherein
p is the sequence number of the actually generated beam signal channel, i is the sequence number of the reference beam, $\operatorname{angle}(w_{p,r})$ is a phase value of a beam codebook of a beam with a sequence number r, M is the number of the actually generated beam signal channels, m is the set number of the target beam signal channels, K is the number of target beams, r is a sequence number of a target beam, values of p are 0, 1, . . . , M−1 successively, values of r are 0, 1, . . . , i−1, i+1, . . . , K−1 successively, and is a phase value of the beam codebook of the reference beam.

10. A beam codebook generation apparatus, comprising:
an array response factor obtaining unit, configured to calculate a first array response factor of a reference beam with a specified sequence number in target beams according to the number of actually generated beam signal channels, and calculate a second array response factor of the reference beam in the target beams according to the preset number of target beam signal channels;
a radiation factor obtaining unit, configured to perform radiated power normalization processing on the first array response factor, which is obtained by the array response factor obtaining unit, to obtain a first radiation factor of the reference beam, and perform radiated power normalization processing on the second array response factor, which is obtained by the array response factor obtaining unit, to obtain a second radiation factor of the reference beam;
a first beam codebook obtaining unit, configured to perform normalization processing on the first radiation factor and the second radiation factor of the reference beam, which are obtained by the radiation factor obtaining unit, to obtain a beam codebook of the reference beam; and
a second beam codebook obtaining unit, configured to perform rotation processing on the beam codebook of the reference beam to obtain a beam codebook of one or more other beams except the reference beam in the target beams, wherein the beam codebook of the reference beam is obtained by the first beam codebook obtaining unit.

11. The beam codebook generation apparatus according to claim 10, further comprising:
a setting unit, configured to set the number of the target beam signal channels and the sequence number of the reference beam, wherein a value of the set number of the target beam signal channels is less than or equal to the number of the beam signal channels.

12. The beam codebook generation apparatus according to claim 10, wherein the setting unit sets the sequence number of the reference beam to be less than or equal to the number of the target beam signal channels.

13. The beam codebook generation apparatus according to claim 10, wherein the array response factor obtaining unit is specifically configured to calculate the first array response factor of the reference beam in the target beams according to a formula $$AF_i^{(M,m)} = w_i^H a(\theta) = \sum_{p=0}^{M-1} w_p^* e^{j\frac{d}{\lambda}2\pi p\sin\theta},$$

wherein i is the sequence number of the reference beam, $AF_i^{(M,m)}$ is a first array response factor of a reference beam with a sequence number i, $W_i$ is an array weighted vector of the reference beam in a beam codebook matrix, H and * indicate conjugate transpose and conjugate respectively, p is a sequence number of an actually generated beam signal channel, wherein values of p are 0, 1, . . . , M−1 successively, M is the number of the actually generated beam signal channels, m is the set number of target beam signal channels, θ is an angle of direction of arrival, a(θ) is a steering vector of a received signal, and d and λ are array element spacing and a carrier wavelength respectively; and the array response factor obtaining unit is specifically configured to: according to a formula $$AF_i^{(m)} = w_i^H a(\theta) = \sum_{q=0}^{m-1} w_{q,i}^* e^{j\frac{d}{\lambda}2\pi p\sin\theta},$$

calculate the second array response factor of the reference beam in the target beams, wherein i is the sequence number of the reference beam, $AF_i^{(m)}$ is the second array response factor of the reference beam with the sequence number i, $W_i$ is the array weighted vector of the reference beam in the beam codebook matrix, H and * indicate conjugate transpose and conjugate respectively, q is a sequence number of a target beam signal channel, wherein values of q are 0, 1, . . . , m−1 successively, m is the set number of the target beam signal channels, θ is the angle of direction of arrival, a(θ) is the steering vector of the received signal, and d and λ are the array element spacing and the carrier wavelength respectively.

14. The beam codebook generation apparatus according to claim 13, wherein the radiation factor obtaining unit is specifically configured to calculate the first radiation factor of the reference beam in the target beams according to a formula $$G_i^{(M,m)} = \frac{\|AF_i^{(M,m)}\|^2}{m \times \int \|AF_i^{(M,m)}\|^2 d\theta},$$

wherein i is the sequence number of the reference beam, $G_i^{(M,m)}$ is a first radiation factor of the reference beam with the sequence number i, $AF_i^{(M,m)}$ is the first array response factor of the reference beam, m is the set number of the target beam signal channels, θ is the angle of direction of arrival, and d is the array element spacing expressed by the carrier wavelength; and the radiation factor obtaining unit is specifically configured to calculate the second radiation factor of the reference beam in the target beams according to a formula $$\mathcal{G}_i^{(m)} = \frac{\|AF_i^{(m)}\|^2}{m \times \int \|AF_i^{(m)}\|^2 d\theta},$$

wherein i is the sequence number of the reference beam, $\mathcal{G}_i^{(m)}$ is a second radiation factor of the reference beam with the sequence number i, $AF_i^{(m)}$ is the second array response factor of the reference beam, m is the set number of the target beam signal channels, θ is the angle of direction of arrival, and d is the array element spacing expressed by the carrier wavelength.

15. The beam codebook generation apparatus according to claim 14, wherein the first beam codebook obtaining unit is specifically configured to: according to a formula $$w_i^{(M,m)} = \underset{|w_{p,i}|=1}{\operatorname{argmin}}\left\{\int_0^{2\pi} |\mathcal{G}_i^{(m)} - G_i^{(M,m)}|^2 d\theta\right\},$$

calculate the beam codebook of the reference beam, wherein i is the sequence number of the reference beam, $w_i^{(M,m)}$ is a beam codebook of the reference beam with the sequence number i, M is the number of the actually generated beam signal channels, m is the set number of the target beam signal channels, p is the sequence number of the actually generated beam signal channel, wherein values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, d is the array element spacing expressed by the carrier wavelength, and $|w_{p,i}|=1$ indicates a phase control condition.

16. The beam codebook generation apparatus according to claim 14, wherein the first beam codebook obtaining unit is specifically configured to: according to a formula $$w_i^{(M,m)} = \underset{|w_{p,i}|=1}{\operatorname{argmin}}\left\{\int_0^{2\pi} |\mathcal{G}_i^{(m)} - G_i^{(M,m)}|^2 d\theta\right\},$$

calculate the beam codebook of the reference beam, wherein i is the sequence number of the reference beam, $w_i^{(M,m)}$ is a beam codebook of the reference beam with the sequence number i, M is the number of the actually generated beam signal channels, m is the set number of the target beam signal channels, p is the sequence number of the actually generated beam signal channel, wherein values of p are 0, 1, . . . , M−1 successively, $\mathcal{G}_i^{(m)}$ is the second radiation factor of the reference beam, $G_i^{(M,m)}$ is the second radiation factor of the reference beam, θ is the angle of direction of arrival, d is the array element spacing expressed by the carrier wavelength, and $|w_{p,i}|=1$ indicates a phase control condition.

17. The beam codebook generation apparatus according to claim 14, wherein the first beam codebook obtaining unit is specifically configured to: according to a formula $$w_i^{(M,m)} = \underset{|w_{p,i}|=1}{\operatorname{argmin}} \left\{ \int_0^{2\pi} |\mathcal{G}_i^{(m)} - G_i^{(M,m)}|^2 d\theta \right\},$$

calculate the beam codebook of the reference beam, wherein i is the sequence number of the reference beam, $w_i^{(M,m)}$ is the beam codebook of the reference beam with the sequence number i, M is the number of the actually generated beam signal channels, m is the set number of the target beam signal channels, p is the sequence number of the actually generated beam signal channel, wherein values of p are 0, 1, . . . , M−1 successively, $\mathcal{G}_i^{(m)}$ is the second radiation factor of the reference beam, $G_i^{(M,m)}$ is the first radiation factor of the reference beam, θ is the angle of direction of arrival, and d is the array element spacing expressed by the carrier wavelength.

18. The beam codebook generation apparatus according to claim 14, wherein the second beam codebook obtaining unit is specifically configured to: according to a formula $$\operatorname{angle}(w_{p,r}) = \operatorname{angle}(w_{p,i}) + p\frac{q-m}{2m}\pi,$$

calculate the beam codebook of one or more other beams except the reference beam in the target beams, wherein p is the sequence number of the actually generated beam signal channel, i is the sequence number of the reference beam, $\operatorname{angle}(w_{p,r})$ is a phase value of a beam codebook of a beam with a sequence number r, M is the number of the actually generated beam signal channels, m is the set number of the target beam signal channels, K is the number of target beams, r is a sequence number of a target beam, values of p are 0, 1, . . . , M−1 successively, values of r are 0, 1, . . . i−1, i+1, . . . , K−1 successively, and $\operatorname{angle}(w_{p,i})$ is a phase value of the beam codebook of the reference beam.

19. The beam codebook generation apparatus according to claim 10, wherein the beam signal channel is an antenna array element channel or a filter channel.

* * * * *

UNITED STATES PATENT AND TRADEMARK OFFICE
CERTIFICATE OF CORRECTION

PATENT NO. : 9,160,433 B2
APPLICATION NO. : 14/610583
DATED : October 13, 2015
INVENTOR(S) : Liu et al.

It is certified that error appears in the above-identified patent and that said Letters Patent is hereby corrected as shown below:

In the claims

Column 30, line 43, $\mathscr{G}_i^{(m)}$ should read -- $\mathcal{G}_i^{(m)}$ --.

Column 31, line 5, $\mathscr{G}_i^{(m)}$ should read -- $\mathcal{G}_i^{(m)}$ --.

Column 31, line 33, $\mathscr{G}_i^{(m)}$ should read -- $\mathcal{G}_i^{(m)}$ --.

Column 31, line 47, $w_i^{(M,m)} = \underset{|w_{p,i}|=1}{\mathrm{argmin}}\left\{\int_0^{2\pi} |\mathscr{G}_i^{(m)} - G_i^{(M,m)}|^2 d\theta\right\}$, should read -- $\mathbf{w}_i^{(M,m)} = \mathrm{argmin}\left\{\int_0^{2\pi} |\mathcal{G}_i^{(m)} - G_i^{(M,m)}|^2 d\theta\right\}$ --.

Column 31, line 60, $\mathscr{G}_i^{(m)}$ should read -- $\mathcal{G}_i^{(m)}$ --.

Column 32, line 22, "and is a phase value" should read -- and angle ($w_{p,i}$) is a phase value --.

Signed and Sealed this
Thirty-first Day of May, 2016

Michelle K. Lee
*Director of the United States Patent and Trademark Office*

CERTIFICATE OF CORRECTION (continued)
U.S. Pat. No. 9,160,433 B2

In the claims

Column 34, line 9, $\mathcal{G}_{i\,i}^{(m)}$ should read -- $\mathcal{G}_i^{(m)}$ --.

Column 34, line 35, $\mathcal{G}_{i\,i}^{(m)}$ should read -- $\mathcal{G}_i^{(m)}$ --.

Column 34, line 46, $$w_i^{(M,m)} = \underset{|w_{p,i}|=1}{\arg\min} \left\{ \int_0^{2\pi} |\mathcal{G}_i^{(m)} - G_i^{(M,m)}|^2 d\theta \right\}$$
should read -- $$\mathbf{w}_i^{(M,m)} = \underset{|w_{p,i}|=1}{\arg\min} \left\{ \int_0^{2\pi} \left| \mathcal{G}_i^{(m)} - G_i^{(M,m)} \right|^2 d\theta \right\}$$ --.

Column 34, line 59, $\mathcal{G}_{i\,i}^{(m)}$ should read -- $\mathcal{G}_i^{(m)}$ --.

Column 35, line 1, $$w_i^{(M,m)} = \underset{|w_{p,i}|=1}{\arg\min} \left\{ \int_0^{2\pi} |\mathcal{G}_i^{(m)} - G_i^{(M,m)}|^2 d\theta \right\}$$
should read -- $$\mathbf{w}_i^{(M,m)} = \arg\min \left\{ \int_0^{2\pi} \left| \mathcal{G}_i^{(m)} - G_i^{(M,m)} \right|^2 d\theta \right\}$$ --.

Column 35, line 15, $\mathcal{G}_{i\,i}^{(m)}$ should read -- $\mathcal{G}_i^{(m)}$ --.